United States Patent
Dehnert et al.

[11] 3,974,123
[45] Aug. 10, 1976

[54] DYES FOR THERMOPLASTICS

[75] Inventors: Johannes Dehnert, Ludwigshafen; Gunther Lamm, Hassloch, both of Germany

[73] Assignee: BASF Aktiengesellschaft, Ludwigshafen (Rhine), Germany

[22] Filed: Feb. 20, 1975

[21] Appl. No.: 551,493

[30] Foreign Application Priority Data

Mar. 1, 1974 Germany............................ 2409754
Aug. 2, 1974 Germany............................ 2437203
Aug. 8, 1974 Germany............................ 2438130

[52] U.S. Cl............................. 260/40 P; 260/37 P; 260/37 N; 260/37 NP; 260/37 PC; 260/42.21
[51] Int. Cl.². ...................... C08K 5/23; C08K 5/45
[58] Field of Search............. 260/156, 37 P, 37 PC, 260/40 P, 42.21, 37 N

[56] References Cited
UNITED STATES PATENTS

| | | | |
|---|---|---|---|
| 3,507,951 | 4/1970 | Morecroft et al. ............ | 260/37 P X |
| 3,640,674 | 2/1972 | Berrie et al. .................... | 260/156 X |
| 3,725,383 | 4/1973 | Austin et al. ................... | 260/156 X |
| 3,817,975 | 6/1974 | Berrie et al. .................... | 260/156 |

OTHER PUBLICATIONS

*Modern Plastics Encyclopedia,* for 1963 (vol. 40, No. 1A), Sept. 1962, p. 496.

Primary Examiner—Lewis T. Jacobs
Assistant Examiner—S. M. Person
Attorney, Agent, or Firm—Johnston, Keil, Thompson & Shurtleff

[57] ABSTRACT

Dyes of the formula

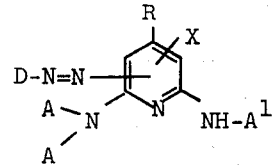

where
D is the radical of the diazo component,
R is hydrogen, alkyl or aryl,
X is hydrogen, cyano or carbamoyl
A¹ is A or

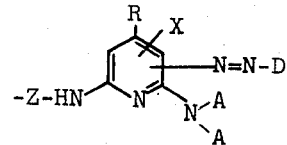

and
A is hydrogen or an optionally substituted hydrocarbon radical, are eminently suitable for coloring thermoplastic resinous material. Colorations stable to heat and with excellent fastness properties are obtained, the color strength of the dyes being remarkable.

7 Claims, No Drawings

DYES FOR THERMOPLASTICS

The invention relates to a process for coloring thermoplastics with dyes of the formula I

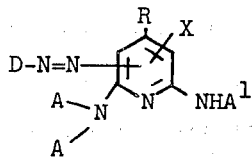

wherein $A^1$ is A or

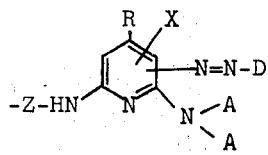

D is the radical of a diazo component,
R is hydrogen, alkyl, methylphenyl or phenyl,
X is hydrogen, carbamoyl or cyano,
Z is alkylene, cycloalkylene, aralkylene or arylene, and the alkylene can be interrupted by oxygen, sulfur or N-substituted imino, the
A's independently of one another are hydrogen, unsubstituted or substituted alkyl, cycloalkyl, aralkyl, phenyl or acyl, and two
A's together with the nitrogen are a saturated heterocyclic ring of five to seven members.

The radicals D are derived, in particular, from amines of the benzene, benzthiazole, benzisothiazole, thiazole, thiadiazole, thiophene, azobenzene or anthraquinone series.

Examples of substituents of the radicals D of the diazo component are:

In the benzene series: chlorine, bromine, nitro, cyano, trifluoromethyl, methylsulfonyl, ethylsulfonyl, phenylsulfonyl, carbomethoxy, carbobutoxy, carbo-$\beta$-ethylhexoxy, carbo-$\beta$-methoxyethoxy, carbo-$\beta$-hydroxyethoxy, optionally N-monosubstituted or N-disubstituted carboxylic acid amide or sulfonamide, methyl, ethyl, butyl, octyl, hexyl, methoxy or ethoxy; N-substituents of the carboxylic acid amides or sulfonamides are, eg., methyl, ethyl, propyl, butyl, $\beta$-hydroxyethyl, $\gamma$-hydroxypropyl, $\beta$-methoxyethyl, $\gamma$-methoxypropyl or $\gamma$-ethoxypropyl, or groups which form the pyrrolidide, piperidide or morpholide.

In the azobenzene series: chlorine, bromine, nitro, cyano, methyl, ethyl, methoxy or ethoxy.

In the heterocyclic series: chlorine, bromine, nitro, cyano, methyl, $C_{17}H_{35}$, ethyl, phenyl, methoxy, ethoxy, methylmercapto, $\beta$-carbomethoxyethylmercapto, $\beta$-carboethoxyethylmercapto, carbomethoxy, carboethoxy, carbo-$\beta$-ethylhexoxy, acetyl, methylsulfonyl or ethylsulfonyl.

Preferred diazo components have at least one substituent, such as methylsulfonyl, phenylsulfonyl, ethylsulfonyl, carboalkoxy, optionally N-substituted carbamoyl and, in particular, cyano, chlorine or bromine.

The radical D can specifically be derived from, eg., the following amines: o-, m- or p-nitroaniline, o-, m- or p-cyanoaniline, 2,4-dicyanoaniline, 2,4,6-tribromoaniline, 2-chloro-4-nitroaniline, 2-bromo-4-nitroaniline, 2-cyano-4-nitroaniline, 2-methylsulfonyl-4-nitroaniline, 2-methyl-4-nitroaniline, 2-methoxy-4-nitroaniline, 4-chloro-2-nitroaniline, 4-methyl-2-nitroaniline, 2-hexyl-4-nitroaniline, 4-methoxy-2-nitroaniline, 1-amino-2-trifluoromethyl-4-chlorobenzene, 2-chloro-5-aminobenzonitrile, 2-amino-5-chloro-benzonitrile, 1,-amino-2-nitrobenzene-4-sulfonic acid n-butylamide or $\beta$-methoxyethylamide, 2,4-dinitroaniline, 2,4-dinitro-6-chloroaniline, 2,4-dinitro-6-bromoaniline, 2,4-dinitro-6-cyanoaniline, 1-amino-2,4-dinitrobenzene-6-methylsulfone, 2,6-dichloro-4-nitroaniline, 2,6-dibromo-4-nitroaniline, 2-chloro-6-bromo-4-nitroaniline, 2,6-dicyano-4-nitroaniline, 2-cyano-4-nitro-6-chloroaniline, 2-cyano-4-nitro-6-bromoaniline, 1-aminobenzene-4-methylsulfone, 1-amino-2,6-dibromobenzene-4-methylsulfone, 1-amino-2,6-dichlorobenzene-4-methylsulfone, 1-amino-2,4-dinitrobenzene-6-carboxylic acid methyl ester or $\beta$-methoxyethyl ester, 3,5-dichloroanthranilic acid propyl ester, 3,5-dibromoanthranilic acid $\beta$-methoxyethyl ester, N-acetyl-p-phenylenediamine, 4-aminoacetophenone, 4- or 2-aminobenzophenone, 2- and 4-aminodiphenylsulfone, 5-nitroanthranilic acid methyl ester, isobutyl ester, methyldiglycol ester, $\beta$-methoxyethyl ester, $\beta$-butoxyethyl ester and $\beta$-acetoxyethyl ester, 3- or 4-aminophthalic acid $\beta$-hydroxyethylamide, 3-amino-6-nitrophthalic acid $\beta$-hydroxyethylamide, methylsulfonic acid 2'-aminophenyl ester, 3'-aminophenyl ester or 4'-aminophenyl ester, ethylsulfonic acid 2'-aminophenyl ester, 3'-aminophenyl ester or 4'-aminophenyl ester, butylsulfonic acid 2'-aminophenyl ester, 3'-aminophenyl ester or 4'-aminophenyl ester, benzenesulfonic acid 2'-aminophenyl ester, 3'-aminophenyl ester or 4'-aminophenyl ester, 2-aminoanthraquinone, 1-amino-4-chloroanthraquinone, 2-aminobenzthiazole, 2-amino-benzthiazole-6-carboxylic acid methyl ester, 2-amino-6-methylsulfonylbenzthiazole, 2-amino-6-cyanobenzthiazole, 2-amino-6-nitrobenzthiazole, 5,6- or 6,7-dichloro-2-aminobenzthiazole, 4-amino-5-bromo-7-nitro-1,2-benzisothiazole, 3-amino-5-nitro-2,1-benzisothiazole, 3-amino-5-nitro-7-bromo-2,1-benzisothiazole, 2-aminothiazole, 2-amino-5-nitrothiazole, 2-amino-4-methylthiazole-5-carboxylic acid ethyl ester, 2-amino-4-methyl-5-acetylthiazole, 2-amino-3-cyano-4-methylthiophene-5-carboxylic acid esters of $C_1$- to $C_8$-alkanols or $C_1$- to $C_4$-alkoxyethanol, 2-phenyl-5-amino-1,3,4-thiadiazole, 3-methylmercapto-5-amino-1,2,4-thiadiazole, 3-$\beta$-carbomethoxyethylmercapto-5-amino-1,2,4-thiadiazole and 2,4-dicyano-3,5-dimethylaniline.

Examples of suitable diazo components of the aminoazobenzene series are: 4-aminoazobenzene, 2',3-dimethyl-4-aminoazobenzene, 3',2-dimethyl-4-aminoazobenzene, 2,5-dimethyl-4-aminoazobenzene, 2-methyl-5-methoxy-4-aminoazobenzene, 2-methyl-4',5-dimethoxy-4-aminoazobenzene, 4'-chloro-2-methyl-5-methoxy-4-aminoazobenzene, 4'-nitro-2-methyl-5-methoxy-4-aminoazobenzene, 4'-chloro-2-methyl-4-aminoazobenzene, 2,5-dimethoxy-4-aminoazobenzene, 4'-chloro-2,5-dimethoxy-4-aminoazobenzene, 4'-nitro-2,5-dimethoxy-4-aminoazobenzene, 4'-chloro-2,5-dimethyl-4-aminoazobenzene, 4'-methoxy-2,5-dimethyl-4-aminoazobenzene, 4'-nitro-4-aminoazobenzene, 3,5-dibromo-4-aminoazobenzene, 2,3'-dichloro-4-aminoazobenzene, 3-methoxy-4-aminoazobenzene, 3-chloro-4-aminoazobenzene and 2',3-dichloro-4-aminoazobenzene.

Examples of radicals R other than hydrogen are ethyl, n- or i-propyl, butyl, pentyl, α-ethylpentyl, phenyl or methylphenyl and preferably methyl.

The radicals A can be identical or different. A can be hydrogen or, eg., the following substituents:

(CH$_2$)$_3$OCH—CH$_2$OCH$_3$, (CH$_2$)$_3$OCHCH$_2$OC$_4$H$_9$, (CH$_2$)$_3$OCH$_2$CHOCH$_3$, (CH$_2$)$_3$OCHCH$_2$OC$_2$H$_5$,
       |                 |                  |            |
       CH$_3$            CH$_3$             CH$_3$           CH$_3$ alkyl of 1 to 8 carbon atoms, alkyl optionally substituted by hydroxyl, cyano, alkoxy of 1 to 8 carbon atoms, phenoxy, phenoxyethoxy or benzyloxy; cyclohexyl, norbornyl, benzyl, phenylethyl, phenylhydroxyethyl, phenylpropyl, phenylbutyl, phenyl optionally substituted by chlorine, methyl, methoxy or ethoxy, polyalkoxyalkyl, hydroxypolyalkoxyalkyl, alkanoyloxyalkyl or alkoxycarbonylalkyl, alkanoyl, aralkanoyl, aroyl, alkylsulfonyl or arylsulfonyl.

Examples of radicals

are pyrrolidino, piperidino, morpholino, piperazino, N-methylpiperazino or hexamethyleneimino.

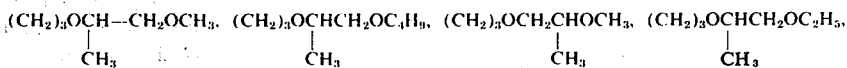

5 (CH$_2$)$_3$OC$_2$H$_4$OC$_6$H$_5$ the corresponding radicals in which two or three groupings -OC$_2$H$_4$-,

—OCH$_2$CH—
       |
      CH$_3$ or -OCH-CH$_2$- are present, CH$_2$CH$_2$OCH$_3$, CH$_2$CH$_2$OC$_2$H$_5$, CH$_2$CH$_2$OC$_3$H$_7$, CH$_2$CH$_2$OC$_4$H$_9$, CH$_2$CH$_2$OC$_6$H$_5$, (CH$_2$)$_3$OCH$_3$, (CH$_2$)$_3$OC$_2$H$_5$, (CH$_2$)$_3$OC$_3$H$_7$, (CH$_2$)$_3$OC$_4$H$_9$, (CH$_2$)$_3$OCH$_2$CHC$_4$H$_9$,
              |
             C$_2$H$_5$ (CH$_2$)$_3$OC$_6$H$_{13}$, (CH$_2$)$_3$OC$_8$H$_{17}$, (CH$_2$)$_3$O—, (CH$_2$)$_3$OCH$_2$C$_6$H$_5$, (CH$_2$)$_3$OC$_2$H$_4$C$_6$H$_5$, (CH$_2$)$_3$OC$_6$H$_5$, —CHCH$_2$OCH$_3$, CHCH$_2$OC$_4$H$_9$, CHCH$_2$OC$_6$H$_5$,
  |            |            |
 CH$_3$        CH$_3$       CH$_3$ CHCH$_2$OCH$_2$C$_6$H$_5$, CH$_2$CHOCH$_3$, CH$_2$—CH—OC$_2$H$_5$, CH$_2$CH—OC$_4$H$_9$, CH$_2$CH—OC$_2$H$_4$C$_6$H$_5$,
|                |               |               |            |
CH$_3$       CH$_3$        CH$_3$       CH$_3$      CH$_3$ Specific examples of radicals A, other than those mentioned above, are:

1. Unsubstituted or substituted alkyl:

CH$_3$, C$_2$C$_5$, n- or i-C$_3$H$_7$, n- or i-C$_4$H$_9$, C$_6$H$_{13}$,

CH$_2$—CH—C$_4$H$_9$,
       |
     C$_2$H$_5$

CH$_2$CH$_2$OH, (CH$_2$)$_3$OH,

CH$_2$CHOH, CH—CH$_2$OH,
    |        |
  CH$_3$    CH$_3$ (CH$_2$)$_4$OH, (CH$_2$)$_6$OH,

CH—(CH$_2$)$_3$C(CH$_3$)$_2$,
|
CH$_3$ (CH$_2$)$_2$O(CH$_2$)$_2$OH, (CH$_2$)$_3$O(CH$_2$)$_4$OH, (CH$_2$)$_3$OC$_2$H$_4$OH, (CH$_2$)$_2$CN, (CH$_2$)$_5$CN, (CH$_2$)$_6$CN, (CH$_2$)$_7$CN, (CH$_2$)$_2$O(CH$_2$)$_2$CN, (CH$_2$)$_3$O(CH$_2$)$_2$CN, (CH$_2$)$_2$O(CH$_2$)$_2$O(CH$_2$)$_2$ CN, (CH$_2$)$_3$OC$_2$H$_4$OCH$_3$, (CH$_2$)$_3$OC$_2$H$_4$OC$_2$H$_5$, (CH$_2$)$_3$O(CH$_2$)$_6$OH, (CH$_3$)OC$_2$H$_4$OCH(CH$_3$)$_2$, (CH$_2$)$_3$OC$_2$H$_4$OC$_4$H$_9$, (CH$_2$)$_3$OC$_2$H$_4$OCH$_2$C$_6$H$_5$, (CH$_2$)$_3$OC$_2$H$_4$OC$_2$H$_4$C$_6$H$_5$,

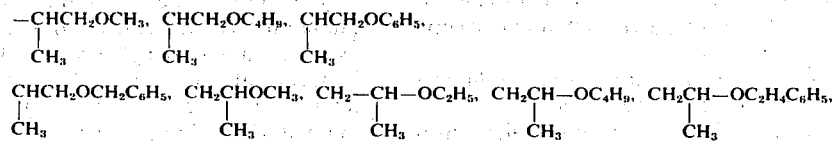

2. Unsubstituted or substituted cycloalkyl and polycycloalkyl:

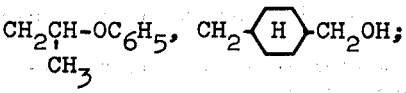

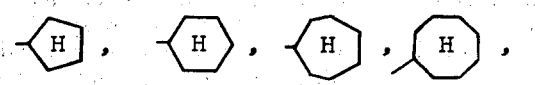

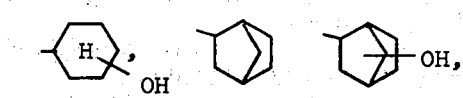

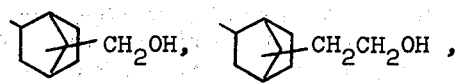

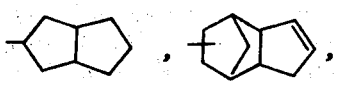

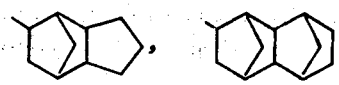

3. Aralkyl:

CH$_2$C$_6$H$_5$, C$_2$H$_4$C$_6$H$_5$,

CH$_2$CH—C$_6$H$_5$, CH$_2$CH$_2$CHC$_6$H$_5$, CH$_2$CH—C$_6$H$_5$,
  |                |                      |
  CH$_3$           CH$_3$                 OH and corresponding radicals with C$_6$H$_4$CH$_3$ in place of C$_6$H$_5$.

4. Unsubstituted or substituted phenyl radicals:

C$_6$H$_5$, C$_6$H$_4$CH$_3$, C$_6$H$_5$(CH$_3$)$_2$, C$_6$H$_4$OCH$_3$, C$_6$H$_4$OC$_2$H$_5$, C$_6$H$_4$OCH$_2$CH$_2$OH and C$_6$H$_4$Cl;

5. CH$_2$CH=CH$_2$, (CH$_2$)$_5$COOCH$_3$, (CH$_2$)$_n$-N⌐⌐O , wherein n is 2, 3, 4 or 6, C$_2$H$_4$OCOCH$_3$, C$_2$H$_4$OCHO, C$_2$H$_4$OCOCH$_3$, (C$_2$H$_4$O)$_2$COCH$_3$, (C$_2$H$_4$O)$_2$CHO, (CH$_2$)$_3$OCOH$_3$ and (CH$_2$)$_3$OCHO.

6. CHO, CH$_3$CO, C$_2$H$_5$CO, C$_3$H$_7$CO,

C$_4$H$_9$CH—CO,
  |
  C$_2$H$_5$

C$_2$H$_5$CO, CH$_3$3C$_6$H$_4$CO, C$_6$H$_5$CH$_2$CO, C$_6$H$_5$OCH$_2$CO, CH$_3$SO$_2$, C$_2$H$_5$SO$_2$, C$_6$H$_5$SO$_2$ and CH$_3$C$_6$H$_4$SO$_2$.

Examples of preferred substituents A are hydrogen, CH$_2$, C$_2$H$_5$, n- or i-C$_3$H$_7$, n- or i-C$_4$H$_9$, C$_6$H$_{13}$,

CH$_2$—CH—C$_4$—H$_9$,
      |
      C$_2$H$_5$ (CH$_2$)$_n$-N⌐⌐O (n= 2, 3, 6), CH$_2$CH$_2$OCH$_3$, CH$_2$CH$_2$OC$_2$H$_5$, CH$_2$CH$_2$OC$_4$H$_9$, (CH$_2$)$_3$OCH$_3$, (CH$_2$)$_3$OC$_2$H$_5$, (CH$_2$)$_3$OC$_3$H$_7$, (CH$_2$)$_3$OC$_4$H$_9$, (CH$_2$)$_3$-O-⟨H⟩ , (CH$_2$)$_3$OCH$_2$-⟨⟩, (CH$_2$)$_3$O-⟨⟩ , (CH$_2$)$_2$O-⟨⟩, (CH$_2$)$_3$OC$_2$H$_4$OCH$_3$, (CH$_2$)$_3$OC$_2$H$_4$OC$_4$H$_9$, (CH$_2$)$_3$OC$_2$H$_4$OC$_6$H$_5$, ⟨H⟩ , ⟨⟩ ,

CH$_2$C$_6$H$_5$, C$_2$H$_4$C$_6$H$_5$,

CH$_2$CHC$_6$H$_5$,
  |
  CH$_3$

C$_6$H$_5$, C$_6$H$_4$CH$_3$ and C$_6$H$_4$OCH$_3$.

Examples of radicals Z are alkylene of 2 to 8 carbon atoms, cycloalkylene of 6 to 18 carbon atoms, with 1 to 3 rings, aralkylene of 7 to 10 carbon atoms and arylene of 6 to 15 carbon atoms. Specific examples are:

—(CH$_2$)$_n$— (n = 2, 3, 4, 6, 8),

CH$_3$
                                    |
—CH$_2$—CH—, —CH$_2$CH—CH$_2$—, —CH$_2$—C—CH$_2$, —CH$_2$—CH—CH$_2$,
      |              |                    |                  |
      CH$_3$         CH$_3$               CH$_3$             OH

—(CH$_2$)$_3$(OC$_2$H$_4$)$_2$O(CH$_2$)$_3$—,    —(CH$_2$)$_3$O(CH$_2$)$_4$O(CH$_2$)$_3$—,

—CH$_2$—CH$_2$CH$_2$—N—CH$_2$CH$_2$CH$_2$—,
                |
                CH$_3$

⟨H⟩ ,

—(CH$_2$)OCH$_2$CH$_2$O(CH$_2$)$_3$—;

⟨H⟩— , -⟨H⟩⟨H⟩- , -⟨H⟩—⟨H⟩ ,
  |
  CH$_2$

-CH$_2$—⟨⟩ , -CH$_2$—⟨⟩—CH$_2$—,

-CH$_2$CH$_2$—⟨⟩ , ⟨⟩ ,

CH$_3$
                            |
⟨⟩—CH$_2$—⟨⟩ and ⟨⟩—C—⟨⟩ .
                            |
                            CH$_3$ Alkylene radicals are particularly preferred, specifically —(CH$_2$)$_p$— (p = 2, 3, 4, 6), as well as —CH$_2$—C(CH$_3$)$_2$—CH$_2$—, —(CH$_2$)$_3$OC$_2$H$_4$O(CH$_2$)$_3$— and —(CH$_2$)$_3$O(CH$_2$)$_4$O(CH$_2$)$_3$—.

The dyes of the formula I may be prepared by reaction of a diazo compound of amines of the formula II

D—NH$_2$ with coupling components of the formula III

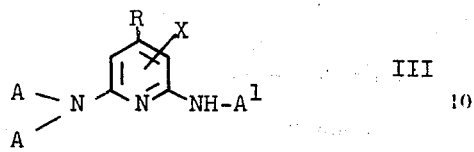

wherein R, X, A, and A$^1$ are as defined above.

The amines are diazotized by conventional methods. The coupling reaction is also carried out by conventional methods, in an aqueous strongly acid to weakly acid medium, if appropriate with solvents added. Sparingly, soluble coupling components are suitably coupled in solvents.

Industrially valuable dyes and dye mixtures are particularly those of the formula Ia

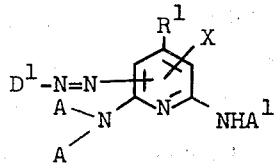

in which
A$^1$ is A or

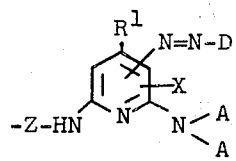

D$^1$ is phenyl substituted by chlorine, bromine, trifluoromethyl, methyl, ethyl, methoxy, nitro, cyano, methylsulfonyl, ethylsulfonyl, phenylsulfonyl, C$_1$- to C$_8$-alkoxycarbonyl, C$_1$- to C$_4$-alkoxycarbonyl, C$_1$- to C$_4$-alkoxyethoxycarbonyl, β-(C$_1$-C$_4$-alkoxyethoxy)-ethoxycarbonyl or N,N-C$_1$- to C$_4$-dialkyl-substituted sulfamoyl; phenylazophenyl; phenylazophenyl substituted by methyl, chlorine, bromine or nitro; benzthiazolyl; benzthiazolyl substituted by nitro, cyano, methylsulfonyl or ethylsulfonyl; benzisothiazolyl; benzisothiazolyl substituted by chlorine, bromine, cyano or nitro; thiazolyl substituted by cyano or nitro; thienyl substituted by methyl, ethyl, propyl, C$_{17}$H$_{35}$, phenyl, cyano, nitro or C$_1$- to C$_8$-alkoxycarbonyl; or thiadiazolyl substituted by phenyl, methyl, chlorine, bromine, methylmercapto, ethylmercapto or C$_1$- to C$_4$-alkoxycarbonylethylmercapto;

R$^1$ is hydrogen or alkyl of 1 to 3 carbon atoms;
X is hydrogen, carbamoyl or cyano;
A is hydrogen; C$_1$- to C$_8$-alkyl; C$_2$- to C$_8$-alkyl substituted by hydroxyl, OCHO, OCOCH$_3$, OCOC$_3$H$_7$, C$_2$- to C$_4$-hydroxyalkoxy, cyano, C$_1$- to C$_8$-alkoxy, C$_1$- to C$_8$-alkoxycarbonyl, phenoxy or phenyl; cyclohexyl, methylcyclohexyl, norbornyl, phenyl, β-hydroxy-β-phenylethyl or (CH$_2$)$_3$(OC$_2$H$_4$)$_m$OT;
m is 1 or 2;
T is C$_1$- to C$_4$-alkyl, benzyl or phenyl,

is pyrrolidino, piperidino, morpholino, hexamethyleneimino, piperazino, N-methylpiperazino or N-β-hydroxyethylpiperazino and
Z is C$_2$- to C$_8$-alkylene,

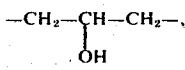

—(CH$_2$)$_3$—N—(CH$_2$)$_3$—, —(CH$_2$)$_3$—OC$_2$H$_4$-O—(CH$_2$-)$_3$—, —(CH$_2$)$_3$—O—(CH$_2$)$_4$ O (CH$_2$)$_3$—,

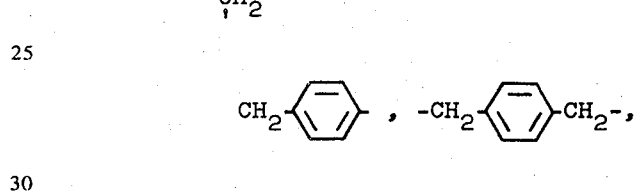

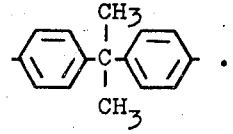

Particularly important dyes are those of the formula Ib

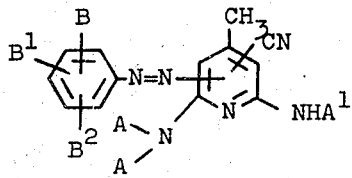

in which
B is nitro, cyano, chlorine, bromine, trifluoromethyl, carbomethoxy, carboethoxy, β-methoxycarboethoxy, methylsulfonyl, ethylsulfonyl, methyl, methoxy, phenylazo, chlorophenylazo or dichlorophenylazo,
B$^1$ is hydrogen, nitro, chlorine, bromine, cyano, methyl, methoxy, carbomethoxy, phenylsulfonyl, carboethoxy, methylsulfonyl or ethylsulfonyl, B² is hydrogen, chlorine, bromine, cyano or methyl and the A's, independently of one another, are hydrogen, unsubstituted or substituted alkyl, cycloalkyl, aralkyl, phenyl or acyl, and A¹ has the above meanings.

Oxygen-free radicals A, and radicals A containing alkoxy groups, are preferred. Further, the dyes with A¹ = A are preferred as being more easily obtainable.

The corresponding dyes which contain, as the diazo component, benzthiazole, benzisothiazole, thiazole, thiadiazole or thiophene which are unsubstituted or substituted by chlorine, bromine, cyano, methyl, methylmercapto, β-carbomethoxyethylmercapto, β-carboethoxyethylmercapto, carbomethoxy, carboethoxy or acetyl, are also particularly valuable.

Amongst the particularly valuable diazo components, the following may be mentioned specifically: 4-nitroaniline, 2-chloro-4-nitroaniline, 2-bromo-4-nitroaniline, 2-cyano-4-nitroaniline, 2-methoxy-4-nitroaniline, 2-amino-5-nitrophenylsulfonic acid dimethylamide, 2-amino-5-nitrophenylsulfonic acid butylamide, 2-amino-5-nitrophenylsulfonic acid β-methoxyethylamide, 2-aminobenzonitrile, 3-chloro-4-aminobenzonitrile, 2-chloro-5-aminobenzonitrile, 2-amino-5-chlorobenzonitrile, 3,5-dichloro-2-aminobenzonitrile, 1-amino-2,4-dicyanobenzene, 1-amino-2,4-dicyano-6-chlorobenzene, 2-chloro-4-amino-5-nitrobenzonitrile, 2-amino-3-chloro-5-nitrobenzonitrile, 2-amino-3-bromo-5-nitrobenzonitrile, 2,6-dicyano-4-nitroaniline, 2,5-dichloro-4-nitroaniline, 2,6-dichloro-4-nitroaniline, 2,6-dibromo-4-nitroaniline, 2-chloro-6-bromo- —4-nitroaniline, 2,4-dinitroaniline, 2,4-dinitro-6-chloroaniline, 2,4-dinitro-6-bromoaniline, 2-amino-3,5-dinitrobenzonitrile, 1-amino-4-nitrobenzene-2-methylsulfone, 1-amino-4-nitrobenzene-2-ethylsulfone, 4-methylsulfonylaniline, 1-amino-2-chlorobenzene-4-methylsulfone, 1-amino-2,6-dibromobenzene-4-methylsulfone, 1-amino-2,6-dichlorobenzene-4-methylsulfone, 2-amino-diphenylsulfone, 2-amino-5-nitrobenzoic acid esters, 2-amino-3-chloro-5-nitrobenzoic acid esters, 2-amino-3,5-dichlorobenzoic acid esters, 4-aminoazobenzene, 2,3'-dimethyl-4-aminoazobenzene, 2',3-dimethyl-4-aminoazobenzene, 2,5-dimethyl-4-aminoazobenzene, 3,5-dibromo-4-aminoazobenzene, 3-chloro-4-aminoazobenzene, 2,3-dichloro-4-aminoazobenzene, 2,4-dicyano-3,5-dimethylaniline, 2-trifluoromethylaniline and 2-trifluoromethyl-4-chloroaniline.

Examples of particularly valuable heterocyclic diazo components are 2-amino-4-methylthiazole-5-carboxylic acid ethyl ester, 2-amino-5-phenyl-1,3,4-thiadiazole, 3-phenyl-5-amino-1,2,4-thiadiazole, 3-methylmercapto-5-amino-1,2,4-thiadiazole, 3-β-carbomethoxyethylmercapto-5-amino-1,2,4-thiadiazole, 3-β-carboethoxyethylmercapto-5-amino-1,2,4-thiadiazole, 2-amino-6-cyanobenzthiazole, 2-amino-3-cyano-4-methylthiophene-5-carboxylic acid esters, 3-amino-5-nitro-2,1-benzisothiazole, 3-amino-5-nitro-7-chloro-2,1-benzisothiazole, 3-amino-5-nitro-7-bromo-2,1-benzisothiazole, 4-amino-7-nitro-1,2-benzisothiazole, 4-amino-5-bromo-1,2-benzisothiazole, 4-amino-5-cyano-7-nitro-1,2-benzisothiazole, 4-amino-5-chloro-7-nitro-1,2-benzisothiazole and 4-aminobenzisothiazole.

The dyes of the formula I are eminently suitable for mass-coloring thermoplastics at temperatures of up to about 300°C. This property of azo dyes of the formula I was unforseeable since azo disperse dyes are usually not as stable to heat as this. In particular, it is surprising that it is especially the azo dyes free from nitro groups which prove very stable to heat on incorporation into molten polyamide. Examples of thermoplastics which can be colored with the above dyes are polystyrene, rigid polyvinyl chloride, polyethylene, polyamides, polyesters, polypropylene, polycarbonates, styrene-butadiene, copolymers are acrylonitrile-butadiene-styrene copolymers. The colorations obtained have excellent fastness properties, especially fastness to light, weathering and plasticizers. The fastness to plasticizers can be modified by selection of the radicals A, whilst the fastness to light depends essentially on D and X.

Compared to dyes of similar hue conventionally used for mass coloring thermoplastics, the dyes of the formula I are of outstanding color strength, which may be up to about 3.5 times that of conventional dyes. Accordingly, the amounts required for coloration are low, being of the order of from 0.01 to about 1% by weight, based on the thermoplastic to be colored. Normally, from 0.03 to 0.05% of dye suffices. As a rule, transparent colorations are obtained, since most of the dyes are soluble in the substrate. Opaque colorations can be obtained by adding, eg., about 1% of titanium dioxide.

The coloration of the thermoplastics is carried out by conventional methods as described, eg., in U.S. Pat. 3,006,882 or British Patent 888,996 (which are incorporated herein by reference).

In the Examples which follow, parts and percentages are by weight, unless stated otherwise.

EXAMPLE 1

22.2 parts of 1.3-propylenediamine are added, in portions, to a mixture of 200 parts by volume of N-methylpyrrolidone, 71 parts of triethylamine and 99 parts of 2,6-dichloro-3-cyano-4-methylpyridine at room temperature. The mixture is then stirred for 5 hours at from 45° to 55°C, diluted with 1,500 parts by volume of water and acidified to pH 1.5 – 2 with hydrochloric acid. The precipitate which separates out is filtered off, washed with water and dried. 97 parts of a product of the formula

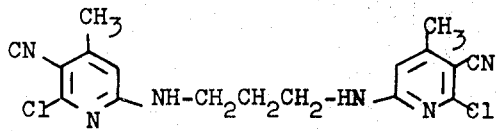

which contains small proportions of the products of the formulae

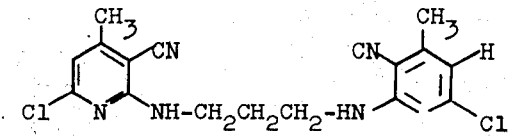

and

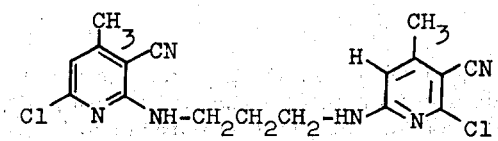

are obtained. 11.4 parts of this mixture are stirred, without prior purification, with 30 parts by volume of methoxypropyleneamine for 5 hours at 150°C; the resulting melt is then caused to dissolve in water by acidifying with hydrochloric acid. This gives a solution of the coupling component of the formula

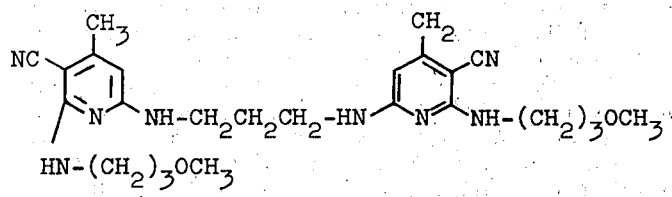

(which still contains small portions of the coupling components of the formulae

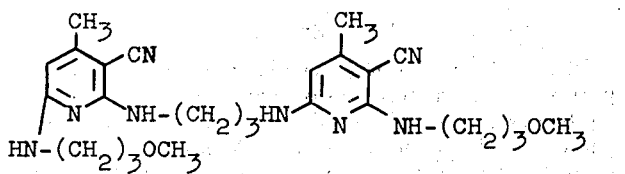

and

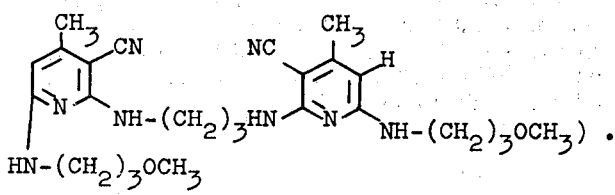

The mixture obtained is cooled to room temperature and added in portions to a solution of 7 parts of 2-aminobenzonitrile which has been diazotized by conventional methods. The coupling mixture is stirred for 15 minutes at pH 1.5 to 0 and is then buffered to pH 2.5 – 3 with sodium acetate at from 0° to 10°C. The product is filtered off, washed with water and dried; 18 parts of a dye powder are obtained, consisting essentially of the compound of the formula

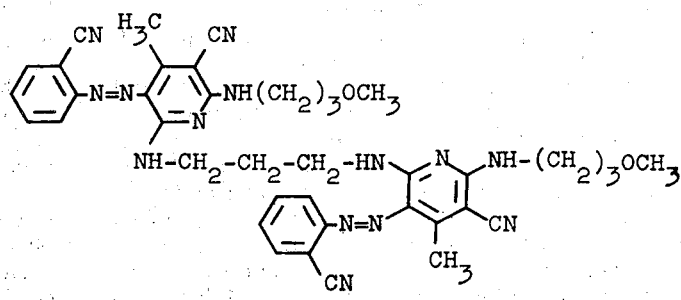

with a proportion of the dyes of the formulae

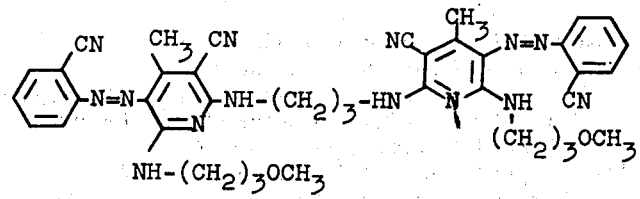

and

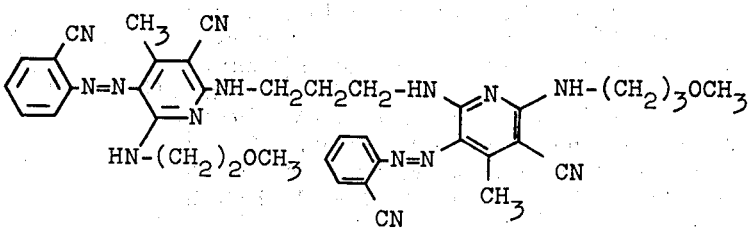

0.5 part of this dye mixture is thoroughly mixed with 1,000 parts of polystyrene granules or powder by conventional methods, and the mixture is then fused. Hereupon, the dye dissolved; it proves stable in the melt at up to 300°C. On solidification, polystyrene having a strong yellow coloration of excellent fastness to light is obtained. The dye proves equally heat-stable when incorporated into fused polyamide, and the mass-colored polyamide is also very fast to light. The dye is also very suitable for the mass coloring of polypropylene, polyethylene, polyvinyl chloride and polyesters.

EXAMPLE 2

78 parts of 1-amino-2-trifluoromethyl-4-chloro-benzene are dissolved in 400 parts of 96% strength sulfuric acid at from 0 to 20°C. The mixture is cooled to from 0° to 4°C, 130 parts of 45% strength nitrosulfuric acid are added and the batch is stirred at from 0° to 5°C for 3 hours. It is then poured onto 1,200 parts of ice, whilst stirring, and the mixture is stirred for a further 30 minutes and then filtered. After destroying excess nitrous acid, 258 parts of the coupling component of the formula

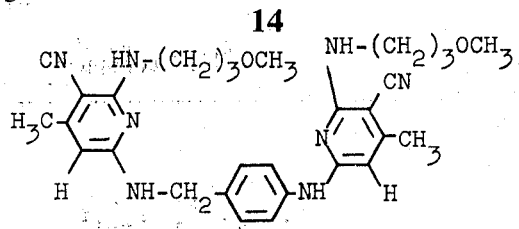

(dissolved in dimethylformamide) are added to the diazonium salt solution and the pH of the coupling solution is raised to 2 -3 by adding sodium hydroxide solution at from 0° to 5°C. When the coupling reaction has ended, the dye which has precipitated, of the formula

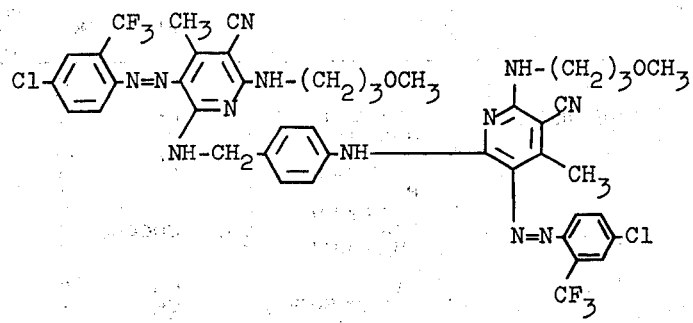

is filtered off, washed with water and dried.

1,000 parts of polystyrene are colored with 0.5 part of this dye, analogously to Example 1; a yellow polystyrene of very good fastness to light is obtained.

The dyes characterized by their substituents in the table which follow can also be used, in the above manner, for mass colorating purposes and give the hues shown in the table.

Table 1

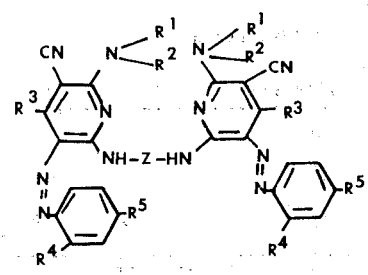

| Example No. | Z | R¹ | R² | R³ | R⁴ | R⁵ | Hue of the mass-colored polystyrene |
|---|---|---|---|---|---|---|---|
| 3 | —CH₂CH₂— | H | (CH₂)₂OCH₃ | C₃H₇ | CN | H | yellow |
| 4 | " | " | (CH₂)₃OCH₃ | CH₃ | " | " | " |
| 5 | " | " | " | " | " | Cl | " |
| 6 | " | " | C₂H₅ | " | " | H | " |
| 7 | " | " | CH₃ | " | " | " | " |
| 8 | " | " | (CH₂)₃OCH(CH₃)₂ | " | " | " | " |
| 9 | " | " | (CH₂)₂OCH₃ | " | " | " | " |
| 10 | " | " | " | " | " | Cl | " |
| 11 | " | " | " | " | CF₃ | H | " |
| 12 | " | " | (CH₂)₃OCH₃ | CH₃ | CF₃ | Cl | " |
| 13 | " | " | C₂H₅ | " | CN | H | " |

Table 1-continued

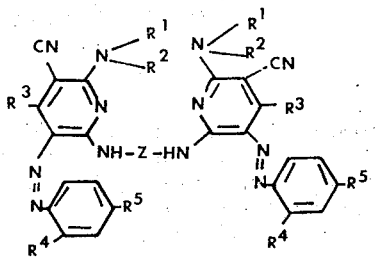

| Example No. | Z | R¹ | R² | R³ | R⁴ | R⁵ | Hue of the mass-colored polystyrene |
|---|---|---|---|---|---|---|---|
| 14 | '' | '' | '' | '' | $CF_3$ | H | '' |
| 15 | '' | '' | '' | '' | '' | Cl | '' |
| 16 | $-CH_2CH_2CH_2-$ | '' | $CH_2CH_2OH$ | '' | CN | H | '' |
| 17 | '' | '' | $(CH_2)_3OH$ | '' | '' | '' | '' |
| 18 | '' | '' | '' | '' | $CF_3$ | Cl | '' |
| 19 | '' | '' | $CH_2CH_2OCH_3$ | '' | '' | H | '' |
| 20 | '' | '' | H | '' | '' | '' | '' |
| 21 | '' | '' | $CH_2CH_2OCH_3$ | $C_3H_7$ | '' | '' | '' |
| 22 | '' | '' | $C_2H_5$ | $CH_3$ | $COOCH_3$ | '' | '' |
| 23 | '' | '' | $CH_2CH_2OCH_3$ | '' | '' | '' | '' |
| 24 | '' | '' | '' | '' | '' | Cl | '' |
| 25 | '' | '' | '' | '' | CN | '' | '' |
| 26 | '' | '' | $(CH_2)_3OCH(CH_3)_2$ | '' | $CF_3$ | H | '' |
| 27 | '' | '' | $CH_2CH_2OH$ | '' | '' | '' | '' |
| 28 | '' | '' | $C_2H_5$ | '' | CN | Cl | '' |
| 29 | '' | '' | '' | $C_3H_7$ | '' | '' | '' |
| 30 | '' | '' | '' | '' | $CF_3$ | H | '' |
| 31 | '' | '' | $CH_2CH_2OCH_3$ | $CH_3$ | '' | '' | '' |
| 32 | '' | '' | '' | '' | CN | '' | '' |
| 33 | '' | '' | '' | '' | $COOCH_3$ | Cl | '' |
| 34 | $-(CH_2)_3-$ | '' | H | $CH_3$ | CN | H | '' |
| 35 | '' | '' | '' | '' | $CF_3$ | '' | '' |
| 36 | '' | '' | $CH_2CH_2CH_2OCH_3$ | '' | CN | '' | '' |
| 37 | '' | '' | '' | H | $SO_2C_6H_5$ | '' | '' |
| 38 | '' | '' | $CH_2CH_2OH$ | $CH_3$ | CN | '' | '' |
| 39 | '' | '' | $CH_2CH_2OCH_3$ | '' | '' | '' | '' |
| 40 | '' | '' | '' | $C_3H_7$ | '' | '' | '' |
| 41 | '' | '' | '' | $CH_3$ | '' | Cl | '' |
| 42 | '' | '' | $CH_2CH_2CH_2OCH_3$ | '' | '' | H | '' |
| 43 | '' | '' | $CH_2CH_2C_6H_5$ | '' | '' | '' | '' |
| 44 | '' | '' | '' | '' | '' | Cl | '' |
| 45 | '' | '' | $CH_2CH_2CH_2OCH_3$ | '' | '' | H | '' |
| 46 | '' | '' | $CH_2CH_2OH$ | '' | '' | '' | '' |
| 47 | '' | '' | $CH_2CH_2CH_2OCH_3$ | '' | '' | '' | '' |
| 48 | $-CH_2-\underset{\underset{CH_3}{\mid}}{\overset{\overset{CH_3}{\mid}}{C}}-CH_2-$ | '' | $CH_2CH_2CH_2OCH_3$ | '' | '' | '' | '' |
| 49 | '' | '' | $CH_2CH_2OH$ | '' | '' | '' | '' |

| Example No. | Z | R¹ | R² | R³ | R⁴ | R⁵ | |
|---|---|---|---|---|---|---|---|
| 50 | $-(CH_2)_3-$ | $(CH_2)_3OCH_2C_6H_5$ | H | $CH_3$ | CN | H | yellow |
| 51 | '' | $(CH_2)_3OCH_2CH_2OC_6H_5$ | '' | '' | '' | '' | '' |
| 52 | '' | $(CH_2)_3O(CH_2)_4OH$ | '' | '' | '' | '' | '' |
| 53 | '' | $(CH_2)_3O(CH_2)_2OC_4H_9$ | '' | '' | '' | '' | '' |
| 54 | '' | $C_6H_5$ | | | | | yellow |
| 55 | '' | '' | '' | '' | '' | Cl | orange |
| 56 | '' | $C_6H_4CH_3$ | '' | '' | '' | H | '' |
| 57 | '' | $(CH_2)_6-N\underset{}{\bigcirc}=O$ | '' | '' | '' | '' | yellow |
| 58 | '' | $-CH(CH_2)_3\underset{\underset{CH_3}{\mid}}{\overset{\overset{CH_3}{\mid}}{C}}-OH$ with $CH_3$ | '' | '' | '' | '' | '' |

Table 1—Continued

| Example No. | Z | R¹ | R² | R³ | R⁴ | R⁵ |
|---|---|---|---|---|---|---|
| 59 | " | -C₆H₁₁ (cyclohexyl) | " | " | " | " |
| 60 | " | (CH₂)₃O-C₆H₁₁ | " | " | " | " |
| 61 | " | CH₂CH₂OCH₃ | " | H | SO₂C₆H₅ | " |
| 62 | " | (norbornyl) | " | CH₃ | CN | " |
| 63 | " | (CH₂)₃OCHCH₂OCH₃<br>　　　　　　CH₃ | " | " | " | " |
| 64 | " | (CH₂)₃OCH₂CHOC₆H₅<br>　　　　　　CH₃ | " | " | " | " |

Table 2

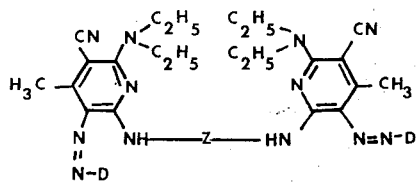

| No. | D | Z | Hue |
|---|---|---|---|
| 65 | 2-cyanophenyl | —CH₂—CH₂— | yellow |
| 66 | " | —(CH₂)₃— | " |
| 67 | " | —(CH₂)₄— | " |
| 68 | " | —(CH₂)₆— | " |
| 69 | " | —CH₂—CH—<br>　　　　CH₃ | " |
| 70 | " | —C₆H₁₀—CH₂—C₆H₁₀— | " |
| 71 | " | C₆H₁₁—CH₂— | " |
| 72 | 4-chloro-2-cyanophenyl | decalinyl | " |
| 73 | " | —C₆H₄—CH₂—C₆H₄— | " |
| 74 | 3-methyl-4-cyano-5-(methoxycarbonyl)thienyl | —CH₂—CH₂— | red |
| 75 | " | —(CH₂)₃— | " |
| 76 | " | —(CH₂)₄— | " |
| 77 | " | —(CH₂)₆— | " |
| 78 | " | —(CH₂)₈— | " |
| 79 | " | —CH₂—CH—<br>　　　　CH₃ | " |

Table 2-continued

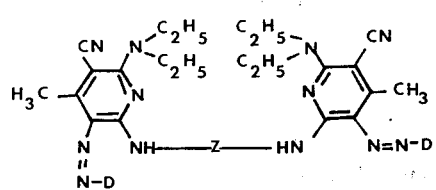

| No. | D | Z | Hue |
|---|---|---|---|
| 80 | (3-methyl-2-methoxycarbonyl-5-methyl thiophene with CN) | cyclopentyl-CH$_2$- | red |
| 81 | " | -CH$_2$-CH$_2$-CH$_2$-N(CH$_3$)-CH$_2$-CH$_2$-CH$_2$- | red |
| 82 | 3-chloro-4-methyl-nitrobenzene | -CH$_2$-CH$_2$- | orange |
| 83 | " | -(CH$_2$)$_3$- | " |
| 84 | " | -(CH$_2$)$_4$- | " |
| 85 | " | -(CH$_2$)$_6$- | " |
| 86 | " | -CH$_2$-CH(CH$_3$)- | " |
| 87 | " | -(CH$_2$)$_3$-N(CH$_3$)-(CH$_2$)$_3$- | " |
| 88 | 3-methoxy-4-methyl-nitrobenzene | -CH$_2$-CH$_2$- | " |
| 89 | " | -(CH$_2$)$_3$- | " |
| 90 | " | -(CH$_2$)$_4$- | " |
| 91 | " | -(CH$_2$)$_6$- | " |
| 92 | " | -CH$_2$-CH(CH$_3$)- | " |
| 93 | " | -(CH$_2$)$_3$-N(CH$_3$)-(CH$_2$)$_3$- | " |
| 94 | " | cyclopentyl-CH$_2$- | " |
| 95 | 3-cyano-4-methyl-nitrobenzene | -CH$_2$-CH$_2$- | red |
| 96 | " | -(CH$_2$)$_3$- | " |
| 97 | " | -(CH$_2$)$_4$- | " |
| 98 | " | -(CH$_2$)$_6$- | " |
| 99 | 3-cyano-4-methyl-nitrobenzene | -(CH$_2$)$_n$- | " |
| 100 | " | -CH$_2$-CH(CH$_3$)- | " |
| 101 | " | -cyclohexyl-CH$_2$-cyclohexyl- | " |

Table 2-continued

[Structure: bis-pyridyl azo dye with diethylamino, CN, CH3, and NH-Z-NH bridge, with N=N-D groups]

| No. | D | Z | Hue |
|---|---|---|---|
| 102 | 2-CN, 4-NO2, 6-Br phenyl | $-(CH_2)_3-$ | bluish red |
| 103 | 2-CN, 4-NO2, 6-Br phenyl | $-(CH_2)_4-$ | " |

Table 3

[Structure: bis-pyridyl azo dye with CH3, CN, NH-R¹, and NH-Z-NH bridge, with N=N-D groups]

| No. | D | R¹ | Z | Hue |
|---|---|---|---|---|
| 104 | 2-CN phenyl | $C_2H_5$ | $-(CH_2)_3O(CH_2)_4O(CH_2)_3-$ | yellow |
| 105 | 2-CN, 5-Cl phenyl | " | " | " |
| 106 | 2-amino-3-ethoxycarbonyl-4-methyl-5-CN thiophene | " | " | red |
| 107 | " | $(CH_2)_3OCH_3$ | $-(CH_2)_3-$ | " |
| 108 | " | " | $-(CH_2)_4-$ | " |
| 109 | 2-CH3, 3-Cl, 5-NO2 phenyl (approx.) | " | $-(CH_2)_3-O(CH_2)_4O(CH_2)_3-$ | yellowish red |

Table 3-continued
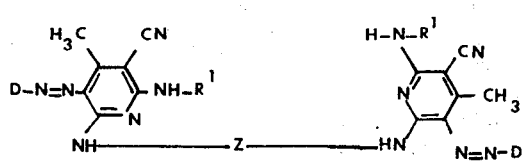
| No. | D | R¹ | Z | Hue |
|---|---|---|---|---|
| 110 | " | $C_2H_5$ | " | " |
| 111 | " | $C_3H_7(n)$ | $-(CH_2)_3-$ | " |
| 112 | " | $C_2H_5$ | $-(CH_2)_3-\underset{\underset{CH_3}{\vert}}{N}-(CH_2)_3-$ | " |
| 113 | 2-CN-4-$O_2N$-C$_6$H$_3$- | " | " | red |
| 114 | " | " | $-(CH_2)_3O(CH_2)_4O(CH_2)_3-$ | " |
Table 4
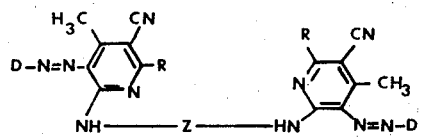
| No. | D | R | Z | Hue |
|---|---|---|---|---|
| 115 | 2-CN-4-CH$_3$-C$_6$H$_3$- | $N\begin{subarray}{l}C_3H_7(n)\\C_3H_7(n)\end{subarray}$ | $-(CH_2)_3O(CH_2)_4O(CH_2)_5$ | yellow |
| 116 | " | pyrrolidino | $-(CH_2)_2-$ | " |
| 117 | " | " | $-(CH_2)_3-$ | " |
| 118 | 2-$CF_3$-C$_6$H$_4$- | " | " | " |
| 119 | 2-(C$_6$H$_5$SO$_2$)-C$_6$H$_4$- | " | " | " |
| 120 | 2-$COOCH_3$-C$_6$H$_4$- | " | " | " |
| 121 | 2-CN-C$_6$H$_4$- | piperidino | " | " |

Table 4-continued

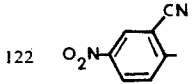

| No. | D | R | Z | Hue |
|---|---|---|---|---|
| 122 | (3-CN, 5-O₂N-phenyl) | " | " | red |
| 123 | (3-Cl, 5-O₂N-phenyl) | " | " | yellowish red |
| 124 | (methyl 3-methyl-4-cyano-5-methylthiophene-2-carboxylate) | " | " | red |
| 125 | (2-methyl-3-cyano-4,5,6,7-tetrahydrobenzothiophene) | HN—C₂H₅ | " | yellowish red |
| 126 | (methyl 3-methyl-4-cyano-5-methylthiophene-2-carboxylate) | piperazinyl N—H | —(CH₂)₃— | red |

Table 5

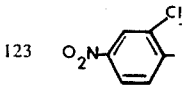

| No. | D | R¹ | Z | X | Hue |
|---|---|---|---|---|---|
| 127 | (3-methyl-5-nitrobenzisothiazole) | CH₂CH₂CH₂OCH₃ | —(CH₂)₃— | CN | reddish blue |
| 128 | " | " | " | CONH₂ | blue |
| 129 | " | " | " | H | " |
| 130 | " | (CH₂)₃OC₄H₉ | " | CN | violet |
| 131 | (methyl 3-methyl-4-cyano-5-methylthiophene-2-carboxylate) | " | " | " | red |

Table 5-continued

| No. | D | R¹ | Z | X | Hue |
|---|---|---|---|---|---|
| 132 | " | (CH₂)₃OCH₂C₆H₅ | " | " | " |
| 133 | O₂N-thiazole (5-nitrothiazol-2-yl) | " | " | " | bluish red |
| 134 | " | CH₂CH₂CH₂OCH₃ | " | " | " |
| 135 | CH₃-S-thiadiazole (5-methylthio-1,3,4-thiadiazol-2-yl) | CH₂CH₂CH₂OCH₃ | —(CH₂)₂— | CN | orange |
| 136 | " | CH₂CH₂OCH₃ | " | " | " |
| 137 | " | " | —(CH₂)₄— | " | yellowish red |
| 138 | " | CH₂CH₂OH | —(CH₂)₃— | " | orange |
| 139 | " | " | " | H | red |
| 140 | " | CH₂CH₂C₆H₅ | " | CN | orange |
| 141 | CH₃OOCC₂H₄S-thiazole | —(CH₂)₃— | CH₂CH₂C₆H₅ | CN | orange |
| 142 | " | " | CH₂CH₂OCH₃ | " | " |
| 143 | " | " | CH₂C₂C₆H₅ | " | " |
| 144 | O₂N-C₆H₃(CN)- | " | CH₂CH₂OCH₃ | CONH₂ | red |
| 145 | " | " | " | H | " |
| 146 | " | " | CH₂CH₂CH₂OCH₃ | " | " |
| 147 | " | " | " | CONH₂ | " |
| 148 | O₂N-C₆H₂(CN)(Cl)- | " | " | " | bluish red |
| 149 | " | " | " | H | " |
| 150 | " | " | " | CONH₂ | " |
| 151 | " | " | CH₂C₂—C₆H₅ | " | " |
| 152 | benzothiazol-2-yl | " | CH₂CH₂OCH₃ | CN | yellowish red |
| 153 | " | " | CH₂CH₂CH₂OCH₃ | " | " |
| 154 | 6-Cl-benzothiazol-2-yl | " | " | " | " |
| 155 | " | " | CH₂CH₂OCH₃ | " | " |
| 156 | benzisothiazolyl | " | " | " | red |

Table 5-continued
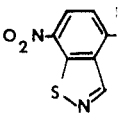
| No. | D | R¹ | Z | X | Hue |
|---|---|---|---|---|---|
| 157 | '' | '' | CH₂CH₂CH₂OCH₃ | '' | '' |
| 158 | 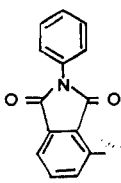 | —(CH₂)₃— | CH₂CH₂CH₂OCH₃ | CN | bluish red |
| 159 | '' | '' | CH₂CH₂OCH₃ | '' | '' |
| 160 | 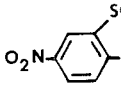 | '' | '' | '' | yellow |
| 161 | '' | '' | CH₂CH₂CH₂OCH₃ | '' | '' |
| 162 | 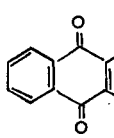 | —(CH₂)₄— | '' | CN | red |
| 163 | '' | '' | '' | CONH₂ | '' |
| 164 | '' | '' | '' | H | '' |
| 165 | '' | —(CH₂)₂— | C₄H₉(n) | '' | '' |
| 166 | 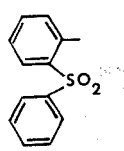 | —(CH₂)₄— | CH₂CH₂CH₂OCH₃ | CN | brown |
| 167 | '' | —(CH₂)₃— | H | '' | yellow-brown |
| 168 | 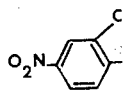 | | '' | '' | yellow |
| 169 | 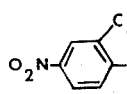 | | '' | '' | orange |
| 170 |  | '' | '' | '' | '' |

Table 5-continued

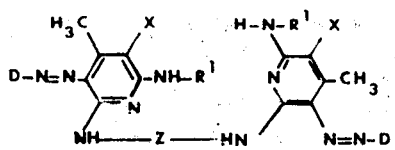

| No. | D | R¹ | Z | X | Hue |
|---|---|---|---|---|---|
| 171 | phenyl-N=N-(2,5-dimethoxyphenyl) | " | " | CN | red |
| 172 | phenyl-N=N-(2,5-dimethylphenyl) | $-(CH_2)_3-$ | $CH_2CH_2OCH_3$ | CN | red |
| 173 | Cl-phenyl-N=N-(2-methylphenyl) | " | " | " | yellowish red |
| 174 | Cl-phenyl-N=N-(2,5-dimethylphenyl) | " | " | " | " |
| 175 | phenyl-N=N-(2,5-dimethoxyphenyl) | " | $(CH_2)_3OCH_2CH(C_2H_5)(n)C_4H_9$ | " | red |
| 176 | phenyl-N=N-phenyl | " | $CH_2CH_2OCH_3$ | H | orange |
| 177 | (2-methylphenyl)-N=N-(3-methylphenyl) | " | $CH_2CH_2OCH_3$ | CN | yellowish red |
| 178 | $O_2N$-(3-Cl-phenyl) | " | $(CH_2)_6OH$ | " | " |
| 179 | " | " | $(CH_2)_3OCH_3$ | " | orange |
| 180 | 2-CN-phenyl | $-CH_2CH_2CH_2NCH_2CH_2CH_2-$ with $CH_3$ | $CH_2CH_2CH_2OCH_3$ | CN | yellow |

Table 5-continued
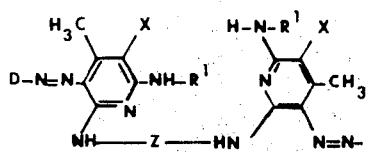
| No. | D | R¹ | Z | X | Hue |
|---|---|---|---|---|---|
| 181 | 2,6-(CH₃)₂-3,5-(CN)₂-C₆H— (CH₃, CN, NC, CH₃ substituted benzene) | —(CH₂)₃— | " | " | yellowish red |
| 182 | " | " | (CH₂)₂CH₂OCOCH₃ | " | yellow |
| 183 | 3-CN-4-Cl-O₂N-C₆H₃— | " | (CH₂)₆OH | " | red |
| 184 | 4-(CH₂CH(C₂H₅)C₄H₉(n))-O₂N-C₆H₃— | " | CH₂CH₂OCH₃ | " | orange |
| 185 | 4-C₄H₉(n)-O₂N-C₆H₃— | " | " | " | " |
| 186 | 2,4,6-Cl₃-C₆H₂— | " | —(CH₂)₃OCH₃ | " | reddish yellow |
| 187 | " | " | C₆H₅ | " | orange |
| 188 | 2,4,5-Cl₃-C₆H₂— | " | (CH₂)₃OCH₃ | " | reddish yellow |
| 189 | 2,5-Cl₂-C₆H₃— | " | " | " | " |

Table 6

| No. | D | R¹ | R² | Z | Hue |
|---|---|---|---|---|---|
| 190 | (O₂N-phenyl-Cl) | H | H | —(CH₂)₃— | orange |
| 191 | " | CH₂CH₂CH₂OCH₃ | CH₂CH₂CH₂OCH₃ | " | red |
| 192 | (phenyl-N=N-phenyl) | H | H | " | orange |
| 193 | " | CH₂CH₂OCH₃ | CH₂CH₂OCH₃ | " | red |
| 194 | (Cl-phenyl-N=N-2,6-dimethylphenyl) | H | H | " | " |
| 195 | " | CH₂CH₂OCH₃ | CH₂CH₂OCH₃ | " | " |
| 196 | (O₂N-phenyl-CN) | (CH₂)₃OCH₃ | H | " | red |
| 197 | CH₃O—C(=O)—(thiophene-CH₃,CN) | " | " | " | violet |

EXAMPLE 198

29.5 parts of 2-aminobenzonitrile are dissolved in 800 parts by volume of water and 80 parts by volume of 30% strength hydrochloric acid at room temperature. 750 parts of ice are then added, followed, at from 0° to 5°C, by 77 parts by volume, added all at once, of a 23% strength sodium nitrite solution. After stirring for two hours at from 0° to 5°C, the following suspension is added to the clear or turbid diazonium salt solution: 66.0 parts of 2,6-bis-(β-methoxyethylamino)-3-cyano-4-methylpyridine are dissolved in 80 parts by volume of warm dimethylformamide, 12.5 parts of an adduct of about 23 moles of ethylene oxide to 1 mole of sperm oil alcohol are then added, and the solution is introduced into a mixture of 30 parts by volume of 30% strength hydrochloric acid and 1,000 parts by volume of water, whilst stirring.

About from 500 to 1,000 parts of ice are added to the coupling solution, followed by about 65 parts of 50% strength sodium hydroxide solution to bring the pH of the mixture to 2.5 – 3.2. After the coupling reaction has terminated, the mixture is warmed to 70°C and the product is filtered off and washed with hot water. After drying, about 97 to 98 parts of a yellow powder of the formula

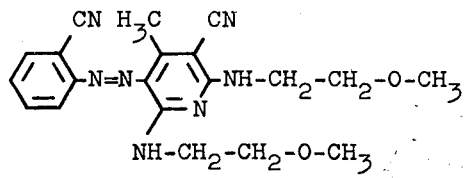

are obtained; the powder gives a yellow solution in dimethyl/formamide.

0.5 part of this dye are mixed thoroughly with 1,000 parts of polystyrene granules or powder by conventional processes. The mixture is then fused, which causes the dye to dissolve. The dye is stable in the melt at up to 300°C. After solidification, a deep yellow polystyrene of excellent fastness to light is obtained. The dye shows equal heat stability when incorporated into fused polyamide. The dye is also very suitable for the mass coloring of polypropylene, polyethylene, polyvinyl chloride or polyesters.

EXAMPLE 199

78 parts of 1-amino-2-trifluoromethyl-4-chlorobenzene are dissolved in 400 parts of 96% strength sulfuric acid at from 0 to 20°C. The mixture is cooled to from 0° to 4°C, 130 parts of 45% strength nitrosylsulfuric acid are added and the batch is stirred for 3 hours at from 0° to 5°C. It is then poured onto 1,200 parts of ice, whilst stirring, stirred for a further 30 minutes and filtered. After destroying excess nitrous acid, 117 parts of the coupling component of the formula

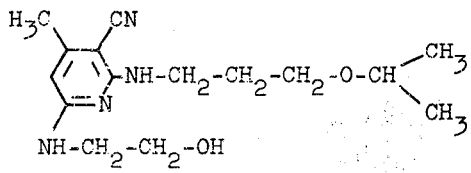

are added to the diazonium salt solution and the pH of the coupling solution is brought to from 2 to 3 by adding sodium hydroxide solution at from 0 to 5°C.

After the coupling reaction has terminated, the dye of the formula

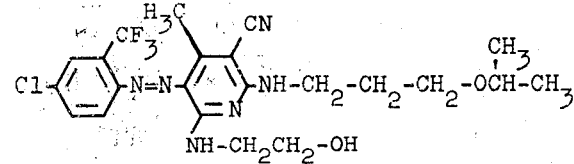

which has precipitated is filtered off, washed with water and dried.

On coloring 1,000 parts of polystyrene with 0.5 part of this dye analogously to EXAMPLE 198, a yellow polystyrene of very good fastness to light is obtained.

Table 7

$$R^5\text{-}\underset{}{\bigcirc}\text{-}N=N\text{-}\underset{NH\text{-}R^2}{\overset{R^4\quad R^3\quad CN}{\bigcirc}}\text{-}NH\text{-}R^1$$

| Example No. | $R^1$ | $R^2$ | $R^3$ | $R^4$ | $R^5$ | Hue of the mass-colored polystyrene |
|---|---|---|---|---|---|---|
| 200 | CH₂CH₂OCH₃ | (CH₂)₂OCH₃ | C₃H₇ | CN | H | yellow |
| 201 | " | (CH₂)₃OCH₃ | CH₃ | " | " | " |
| 202 | " | " | " | " | Cl | " |
| 203 | " | C₂H₅ | " | " | H | " |
| 204 | " | CH₃ | " | " | " | " |
| 205 | " | (CH₂)₃OCH(CH₃)₂ | " | " | " | " |
| 206 | C₂H₅ | (CH₂)₂OCH₃ | " | " | " | " |
| 207 | CH₂CH₂OH | " | " | " | " | " |
| 208 | " | " | " | CF₃ | " | " |
| 209 | CH₂CH₂OH | (CH₂)₃OCH₃ | CH₃ | CF₃ | Cl | " |
| 210 | C₂H₅ | C₂H₅ | " | CN | H | " |
| 211 | " | " | " | CF₃ | H | " |
| 212 | " | " | " | " | Cl | " |
| 213 | C₂H₅ | CH₂CH₂OH | CH₃ | CN | H | " |
| 214 | " | (CH₂)₃OH | " | " | " | " |
| 215 | " | " | " | CF₃ | Cl | " |
| 216 | CH₂CH₂OCH₃ | CH₂CH₂OCH₃ | " | " | H | " |
| 217 | C₆H₅ | H | " | " | " | " |
| 218 | " | CH₂CH₂OCH₃ | " | " | " | " |
| 219 | C₂H₅ | C₂H₅ | " | COOCH₃ | " | " |
| 220 | " | CH₂CH₂OCH₃ | " | " | " | " |
| 221 | " | " | " | " | Cl | " |
| 222 | C₄H₉(n) | " | " | CN | " | " |
| 223 | (CH₂)₃OCH(CH₃)₂ | (CH₂)₃OCH(CH₃)₂ | " | CF₃ | H | " |
| 224 | C₆H₁₃(n) | CH₂CH₂OH | " | " | " | " |
| 225 | H | C₂H₅ | " | CN | Cl | " |
| 226 | " | " | C₃H₇ | " | " | " |
| 227 | " | " | " | CF₃ | H | " |
| 228 | " | CH₂CH₂OCH₃ | CH₃ | " | " | " |
| 229 | " | " | " | CN | " | " |
| 230 | " | " | " | COOCH₃ | Cl | " |
| 231 | CH₂CH₂OCH₃ | H | CH₃ | CN | H | " |
| 232 | " | " | " | CF₃ | H | " |
| 233 | CH₂CH₂CH₂OCH₃ | CH₂CH₂CH₂OCH₃ | " | CN | H | " |
| 234 | " | " | H | SO₂C₆H₅ | " | " |
| 235 | CH₂CH₂—C₆H₅ | CH₂CH₂OH | CH₃ | CN | " | " |
| 236 | " | CH₂CH₂OCH₃ | " | " | " | " |
| 237 | " | " | C₃H₇ | " | " | " |
| 238 | " | " | CH₃ | " | Cl | " |
| 239 | " | CH₂CH₂CH₂OCH₃ | " | " | H | " |
| 240 | " | CH₂CH₂C₆H₅ | " | " | " | " |
| 241 | " | " | " | " | Cl | " |
| 242 | CH₂CH—O—C₆H₅<br>\|<br>CH₃ | CH₂CH₂CH₂OCH₃ | " | " | H | " |
| 243 | CH₂CH₂CH₂OC₆H₅ | CH₂CH₂OH | " | " | " | " |
| 244 | CH₂—CH—C₆H₅<br>\|<br>OH | CH₂CH₂CH₂OCH₃ | " | " | " | " |
| 245 | (CH₂)₃OCH₂C₆H₅ | " | " | " | " | " |
| 246 | " | CH₂CH₂OH | " | " | " | " |
| 247 | (CH₂)₃OCH₂C₆H₅ | CH₂—CH—CH₃<br>\|<br>OH | " | " | " | " |

Table 7-continued

| Example No. | R¹ | R² | R³ | R⁴ | R⁵ | Hue of the mass-colored polystyrene |
|---|---|---|---|---|---|---|
| 248 | (CH₂)₃OCH₂CH₂OC₆H₅ | CH₂CH₂OH | " | " | " | " |
| 249 | (CH₂)₃O(CH₂)₄OH | " | " | " | " | " |
| 250 | (CH₂)₃O(CH₂)₂OC₄H₉ | " | " | " | " | " |
| 251 | C₆H₅ | CH₂CH₂CH₂OCH₃ | " | " | " | yellow |
| 252 | " | " | " | " | Cl | orange |
| 253 | C₆H₄CH₃ | " | " | " | H | " |
| 254 | (CH₂)₆-N pyrrolidinone | " | " | " | " | yellow |
| 255 | —CH(CH₂)₃C(CH₃)₂—OH with CH₃ | " | " | " | " | " |
| 256 | cyclohexyl | CH₂CH₂OCH₂CH₂OH | " | " | " | " |
| 257 | (CH₂)₃O-cyclohexyl | CH₂CH₂OCH₃ | " | " | " | " |
| 258 | CH₂CH₂OCH₃ | " | H | SO₂C₆H₅ | " | " |
| 259 | norbornyl | CH₂CH₂OCH₃ | CH₃ | CN | " | " |
| 260 | (CH₂)₃OCHCH₂OCH₃ with CH₃ | " | " | " | " | " |
| 261 | (CH₂)₃OCH₂CHOC₆H₅ with CH₃ | CH₂CH₂OH | " | " | " | " |
| 262 | (CH₂)₆OH | CH₂CH₂CH₂OCH₃ | CH₃ | CN | H | " |
| 263 | (CH₂)₅—CN | " | " | " | " | " |
| 264 | CH₂CH₂OCH₃ | " | C₆H₅ | " | " | " |
| 265 | " | CH₂CH₂OCH₃ | " | CF₃ | Cl | " |
| 266 | " | " | H | " | " | " |
| 267 | " | " | C₂H₅ | CN | " | " |
| 268 | (CH₂)₅COOCH₃ | " | CH₃ | " | H | " |
| 269 | (CH₂)₅COOC₂H₅ | " | " | " | " | " |
| 270 | (CH₂)₅COOC₃H₇ | " | " | " | " | " |
| 271 | (CH₂)₅COOC₄H₉ | " | " | " | " | " |
| 272 | CH₂CH₂-N piperidinone | CH₂CH₂OCH₃ | " | " | " | " |
| 273 | CH₂CH=CH₂ | " | " | " | " | " |
| 274 | CH₂CH=CH₂ | CH₂CH=CH₂ | " | " | " | " |
| 275 | CH₂CH₂CH₂OH | (CH₂)₃OCH₃ | " | " | " | " |
| 276 | CH₂CH—C₆H₅ with CH₃ | CH₂CH₂OH | " | " | " | " |
| 277 | CH₂CH₂CH₂OCH₃ | SO₂CH₃ | " | " | " | " |
| 278 | CH₂CH₂CH₂OCH₃ | COC₆H₅ | CH₃ | CN | H | yellow |
| 279 | " | SO₂C₆H₅ | " | " | " | " |
| 280 | CH₂CH₂OCH₃ | " | " | " | " | " |

Table 8

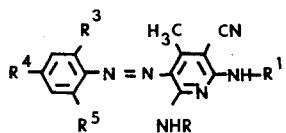

| Example No. | R¹ | R² | R³ | R⁴ | R⁵ | Hue of the mass-colored polystyrene |
|---|---|---|---|---|---|---|
| 281 | H | $C_2H_5$ | H | $NO_2$ | H | yellow |
| 282 | " | $(CH_2)_3OCH_3$ | " | " | " | " |
| 283 | " | $(CH_2)_3OCH(CH_3)_2$ | " | " | " | " |
| 284 | " | $(CH_2)_3OCH_3$ | $CH_3$ | " | " | orange |
| 285 | " | " | $OCH_3$ | " | " | red-orange |
| 286 | $C_2H_5$ | $C_2H_5$ | " | " | " | scarlet |
| 287 | " | " | H | " | " | orange |
| 288 | " | " | CN | " | " | yellowish red |
| 289 | " | $C_3H_7(n)$ | " | " | " | " |
| 290 | " | " | " | " | Cl | bluish red |
| 291 | " | $C_2H_5$ | " | " | " | " |
| 292 | $(CH_2)_3OCH_3$ | " | " | " | " | " |
| 293 | " | " | " | " | " | yellowish red |
| 294 | $(CH_2)_3OCH_3$ | $C_2H_5$ | Cl | $NO_2$ | H | yellowish red |
| 295 | H | " | " | " | " | orange |
| 296 | " | $(CH_2)_3OCH_3$ | " | " | " | " |
| 297 | " | " | $NO_2$ | " | " | red |
| 298 | $C_2H_5$ | " | " | " | " | bluish red |
| 299 | " | " | CN | " | Br | " |
| 300 | $CH_2CH_2OCOCH_3$ | $C_2H_5$ | " | H | H | yellow |
| 301 | $C_2H_5$ | $CH_2CH_2OCOCH_3$ | " | " | " | " |
| 302 | $CH_2CH_2OC_6H_5$ | $CH_2CH_2CH_2OCH_3$ | Cl | $NO_2$ | " | orange |
| 303 | " | " | CN | " | " | yellowish red |
| 304 | $CH_2CH_2CH_2OC_6H_5$ | " | " | " | " | scarlet |
| 305 | " | " | Cl | " | " | orange |
| 306 | $(CH_2)_3OCH_2C_6H_5$ | " | " | " | " | " |
| 307 | $(CH_2)_3OCH_2C_6H_5$ | " | CN | " | " | yellowish red |
| 308 | " | " | " | " | Cl | bluish red |
| 309 | " | " | " | " | Br | " |
| 310 | " | $CH_2CH_2OH$ | " | " | " | " |
| 311 | $(CH_2)_3OCH_2C_6H_5$ | $CH_2CH_2OH$ | Cl | $NO_2$ | H | orange |
| 312 | " | " | CN | " | " | yellowish red |
| 313 | $(CH_2)_3OCH_2CH_2C_6H_5$ | " | " | " | " | scarlet |
| 314 | $(CH_2)_3OCH_2CH_2OC_6H_5$ | " | " | " | " | " |
| 315 | " | " | Cl | " | " | orange |
| 316 | " | $CH_2CH_2OCH_3$ | " | " | " | " |
| 317 | " | " | CN | " | " | yellowish red |
| 318 | " | " | $NO_2$ | " | " | red |
| 319 | " | $CH_2CH_2OH$ | " | " | " | " |
| 320 | " | " | Br | " | " | red-orange |
| 321 | " | " | $COOCH_3$ | " | " | " |
| 322 | " | " | H | " | " | orange |
| 323 | " | " | $SO_2CH_3$ | " | " | red |
| 324 | " | " | $CH_3$ | " | " | orange |
| 325 | " | " | $OCH_3$ | " | " | " |
| 326 | " | " | $SO_2CH_3$ | Cl | " | golden yellow |
| 327 | " | $CH_2CH_2OCH_3$ | CN | $NO_2$ | $NO_2$ | bluish red |
| 328 | " | " | " | " | CN | " |
| 329 | " | " | Cl | " | Cl | yellow-brown |
| 330 | $(CH_2)_3OCH_2CH_2OC_6H_5$ | $CH_2CH_2OCH_3$ | H | $SO_2CH_3$ | Cl | yellow |
| 331 | " | " | Cl | " | H | " |
| 332 | " | " | Br | $NO_2$ | Br | yellow-brown |
| 333 | " | $CH_2CH_2OH$ | $COOCH_3$ | Cl | Cl | yellow |
| 334 | " | " | Cl | $SO_2C_6H_5$ | H | " |
| 335 | " | " | CN | CN | " | orange |
| 336 | " | " | Cl | Cl | Cl | yellow |
| 337 | $CH_2CH_2CH_2OCH_3$ | $CH_2CH_2CH_2OCH_3$ | " | " | " | " |
| 338 | " | " | " | $SO_2CH_3$ | " | " |
| 339 | " | " | H | $N=N-C_6H_5$ | H | orange |
| 340 | $CH_2CH_2OCH_3$ | $CH_2CH_2OCH_3$ | " | " | " | " |
| 341 | " | " | Cl | $SO_2CH_3$ | " | yellow |

Table 9

D—N=N—[pyridine ring with H₃C, X, NH-R¹, NH-R²]

| Example No. | D | R¹ | R² | X | Hue of the mass-colored polystyrene |
|---|---|---|---|---|---|
| 342 | O₂N-[benzisothiazole] | CH₂CH₂CH₂OCH₃ | CH₂CH₂CH₂OCH₃ | CN | reddish blue |
| 343 | '' | '' | '' | CONH₂ | blue |
| 344 | '' | '' | '' | H | '' |
| 345 | '' | (CH₂)₃OC₄H₉ | CH₂CH₂OCH₃ | CN | violet |
| 346 | [thiophene with H₃C, CN, CH₃OC(=O)] | '' | '' | '' | red |
| 347 | '' | (CH₂)₃OCH₂C₆H₅ | '' | '' | '' |
| 348 | O₂N-[thiazole] | '' | '' | '' | bluish red |
| 349 | '' | CH₂CH₂CH₂OCH₃ | CH₂CH₂CH₂OCH₃ | '' | '' |
| 350 | CH₃-S-[thiadiazole] | CH₂CH₂CH₂OCH₃ | CH₂CH₂CH₂OCH₃ | CN | orange |
| 351 | '' | CH₂CH₂OCH₃ | CH₂CH₂OCH₃ | '' | '' |
| 352 | '' | C₆H₅ | '' | '' | yellowish red |
| 353 | '' | CH₂CH₂C₆H₅ | CH₂CH₂OH | '' | orange |
| 354 | '' | '' | '' | H | red |
| 355 | '' | CH₂CH₂C₆H₅ | CH₂CH₂C₆H₅ | CN | orange |
| 356 | CH₃OOCC₂H₄S-[thiazole] | '' | '' | '' | '' |
| 357 | '' | CH₂CH₂OCH₃ | CH₂CH₂OCH₃ | '' | '' |
| 358 | '' | CH₂CH₂C₆H₅ | CH₂CH₂C₆H₅ | '' | '' |
| 359 | O₂N-[benzene with CN, CH₃] | CH₂CH₂OCH₃ | CH₂CH₂OCH₃ | CONH₂ | red |
| 360 | '' | '' | '' | H | '' |
| 361 | '' | CH₂CH₂CH₂OCH₃ | CH₂CH₂CH₂OCH₃ | '' | '' |
| 362 | '' | '' | '' | CONH₂ | '' |
| 363 | O₂N-[benzene with CN, CH₃, Cl] | '' | '' | '' | bluish red |
| 364 | '' | '' | '' | H | '' |
| 365 | O₂N-[benzene with CN, CH₃, Cl] | CH₂CH₂CH₂OCH₃ | CH₂CH₂OH | CONH₂ | bluish red |
| 366 | '' | CH₂CH₂—C₆H₅ | '' | '' | '' |

Table 9-continued

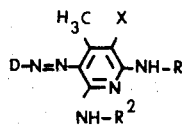

| Example No. | D | R¹ | R² | X | Hue of the mass-colored polystyrene |
|---|---|---|---|---|---|
| 367 |  | $CH_2CH_2OCH_3$ | $CH_2CH_2OCH_3$ | CN | yellowish red |
| 368 | " | $CH_2CH_2CH_2OCH_3$ | $CH_2CH_2CH_2OCH_3$ | " | scarlet |
| 369 | 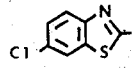 | " | " | " | " |
| 370 | " | $CH_2CH_2OCH_3$ | $CH_2CH_2OCH_3$ | " | " |
| 371 |  | " | " | " | red |
| 372 | " | $CH_2CH_2CH_2OCH_3$ | $CH_2CH_2CH_2OCH_3$ | " | " |
| 373 | 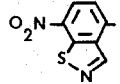 | " | " | " | bluish red |
| 374 | " | $CH_2CH_2OCH_3$ | $CH_2CH_2OCH_3$ | " | " |
| 375 | 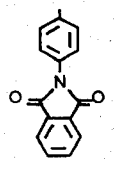 | " | " | " | yellow |
| 376 | " | $CH_2CH_2CH_2OCH_3$ | $CH_2CH_2CH_2OCH_3$ | " | " |
| 377 | 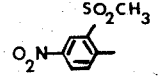 | $CH_2CH_2CH_2OCH_3$ | $CH_2CH_2CH_2OCH_3$ | CN | red |
| 378 | " | " | " | $CONH_2$ | " |
| 379 | " | " | " | H | " |
| 380 | " | $C_4H_9(n)$ | $C_4H_9(n)$ | " | " |
| 381 | 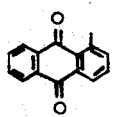 | $CH_2CH_2CH_2OCH_3$ | $CH_2CH_2CH_2OCH_3$ | CN | brown |
| 382 | " | H | $(CH_2)_3OC_2H_4OCH_3$ | " | yellow-brown |
| 383 | 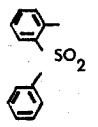 | H | H | " | yellow |
| 384 | 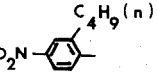 | " | " | " | orange |

Table 9-continued $$D-N=N-\underset{\underset{NH-R^2}{|}}{\overset{\overset{H_3C}{|}\;\overset{X}{|}}{\bigcirc}}-NH-R^1$$

| Example No. | D | R¹ | R² | X | Hue of the mass-colored polystyrene |
|---|---|---|---|---|---|
| 385 | $O_2N-C_6H_3(C_6H_{13}(n))(CH_3)-$ | " | " | " | " |
| 386 | $C_6H_5-N=N-C_6H_2(OCH_3)_2-$ | " | " | CN | red |
| 387 | $C_6H_5-N=N-C_6H_2(CH_3)_2-$ | CH₂CH₂OCH₃ | CH₂CH₂OCH₃ | CN | red |
| 388 | $Cl-C_6H_4-N=N-C_6H_3(CH_3)-$ | " | " | " | yellowish red |
| 389 | $Cl-C_6H_4-N=N-C_6H_2(CH_3)_2-$ | " | CH₂CH₂OH | " | scarlet |
| 390 | $C_6H_5-N=N-C_6H_2(OCH_3)_2-$ | (CH₂)₃OCH₂CH(C₂H₅)(n-C₄H₉) | (CH₂)₂O(CH₂)₂OH | " | red |
| 391 | $C_6H_5-N=N-C_6H_4-$ | H | H | H | orange |
| 392 | $CH_3-C_6H_4-N=N-C_6H_3(CH_3)-$ | CH₂CH₂OCH₃ | CH₂CH₂OCH₃ | CN | yellowish red |
| 393 | $O_2N-C_6H_3(Cl)-$ | (CH₂)₆OH | (CH₂)₆OH | " | " |
| 394 | " | (CH₂)₃OCH₃ | CH₂CH₂OCCH₃‖O | " | orange |

Table 9-continued $$D-N=N-\underset{\underset{NH-R^2}{\big|}}{\overset{\overset{H_3C\quad X}{\big|}}{\bigcirc}}-NH-R^1$$

| Example No. | D | R¹ | R² | X | Hue of the mass-colored polystyrene |
|---|---|---|---|---|---|
| 395 | 2-CN-C₆H₄ | CH₂CH₂CH₂OCH₃ | CH₂CHOCOCH₂OC₆H₅ | CN | yellow |
| 396 | " | " | " | " | " |
| 397 | " | (CH₂)₂CH₂OCOCH₃ | (CH₂)₂CH₂OCOCH₃ | " | " |
| 398 | 2-CN-4-Cl-5-O₂N-C₆H₂ | (CH₂)₆OH | (CH₂)₆OH | " | red |
| 399 | 2-[CH₂CH(C₂H₅)C₄H₉(n)]-4-O₂N-C₆H₃ | CH₂CH₂OCH₃ | CH₂CH₂OCH₃ | " | orange |
| 400 | 2-C₄H₉(n)-4-O₂N-C₆H₃ | " | " | " | " |
| 401 | 2,4,6-Cl₃-C₆H₂ | —(CH₂)₃OCH₃ | (CH₂)₃OCH₃ | " | reddish yellow |
| 402 | " | C₆H₅ | " | " | orange |
| 403 | 2,4,6-Cl₃-C₆H₂ | (CH₂)₃OCH₃ | " | " | reddish yellow |
| 404 | 2,4-Cl₂-C₆H₃ | " | " | " | " |

Table 10

$$D-N=N-\underset{\underset{NH-R^2}{\big|}}{\bigcirc}-NHR^1$$

| Example No. | D | R¹ | R² | Hue of the mass-colored polystyrene |
|---|---|---|---|---|
| 405 | 2-Cl-4-O₂N-C₆H₃ | H | H | orange |

Table 10-continued structure: D—N=N—[ring with NHR¹, NH-R², N]

| Example No. | D | R¹ | R² | Hue of the mass-colored polystyrene |
|---|---|---|---|---|
| 406 | " | $CH_2CH_2CH_2OCH_3$ | $CH_2CH_2CH_2OCH_3$ | red |
| 407 | Ph-N=N-C₆H₄- | H | H | orange |
| 408 | " | $CH_2CH_2OCH_3$ | $CH_2CH_2OCH_3$ | red |
| 409 | Cl-C₆H₄-N=N-(2,5-dimethylphenyl) | H | H | " |
| 410 | " | $CH_2CH_2OCH_3$ | $CH_2CH_2OCH_3$ | " |

Table 11 structure: D—N=N—[pyridine ring with R², CN, NH-R³, NHR¹]

| Example No. | D | R¹ | R² | R³ | Hue |
|---|---|---|---|---|---|
| 411 | Ph-N=N-(3-Cl-C₆H₄) | H | $C_4H_9(n)$ | $CH_3$ | red |
| 412 | " | " | $CH_2CH_2CH_2OCH_3$ | " | " |
| 413 | " | " | $C_6H_{13}(n)$ | " | " |
| 414 | " | " | $CH_2CH-C_4H_9(n)$ with $C_2H_5$ branch | " | " |
| 415 | " | " | cyclohexyl (H) | " | " |
| 416 | " | " | bicyclic | " | " |
| 417 | " | $CH_2CH_2CH_2OCH_3$ | $CH_2CH_2CH_2OCH_3$ | " | " |
| 418 | " | " | " | $C_3H_7(r)$ | " |
| 419 | " | $C_4H_9(n)$ | $C_4H_9(n)$ | $CH_3$ | " |
| 420 | " | $C_6H_{13}(n)$ | $C_6H_{13}(n)$ | " | " |
| 414 | (2-Cl-C₆H₄)-N=N-(3-Cl-C₆H₄-) | " | " | " | " |
| 415 | | $C_4H_9(n)$ | $C_4H_9(n)$ | " | " |
| 416 | | $CH_2CH_2CH_2OCH_3$ | $CH_2CH_2CH_2OCH_3$ | " | " |
| 417 | | H | " | " | " |
| 418 | | H | $C_4H_9(n)$ | $CH_3$ | red |
| 419 | | H | " | $C_3H_7(n)$ | " |
| 420 | | H | $C_6H_{13}(n)$ | $CH_3$ | " |
| 421 | thiophene with $C_2H_5$, CN, $CH_3$, $H_3COC(O)$- | H | $C_4H_9(n)$ | $CH_3$ | " |
| 422 | | H | $CH_2-CH-C_4H_9(n)$ with $C_2H_5$ branch | " | " |

Table 11-continued

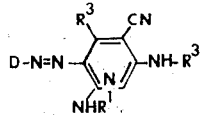

| Example No. | D | R¹ | R² | R³ | Hue |
|---|---|---|---|---|---|
| 423 | | $CH_2CH_2CH_2OCH_3$ | $CH_2CH_2CH_2OCH_3$ | " | ruby |
| 424 | | " | " | $C_2H_5$ | " |
| 425 | | " | $C_4H_9(n)$ | $CH_3$ | " |
| 426 | | $C_4H_9(n)$ | " | " | " |
| 427 | | $C_6H_{13}(n)$ | $C_6H_{13}(n)$ | " | " |
| 428 | 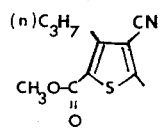 | H | —$CH_2$—$CH_2$—$CH_2$—$OCH_3$ | $CH_3$ | red |
| 429 | | $CH_2CH_2CH_2OCH_3$ | " | $CH_3$ | ruby |
| 430 | | $C_4H_9(n)$ | $C_4H_9(n)$ | " | " |
| 431 | | $CH_2CH_2OCH_3$ | $CH_2CH_2OCH_3$ | " | " |
| 432 | | " | $CH_2CH_2OCH_3$ | " | " |
| 433 | | H | H | " | red |
| 434 | 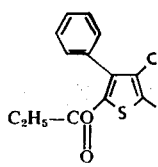 | $CH_2CH_2CH_2OCH_3$ | $CH_2CH_2CH_3OCH_3$ | $CH_3$ | ruby |
| 435 | | $CH_2CH_2OCH_3$ | $CH_2CH_2OCH_3$ | " | " |
| 436 | | $C_4H_9(n)$ | $C_4H_9(n)$ | " | " |
| 437 | 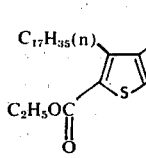 | $CH_2CH_2OCH_3$ | $CH_2CH_2OCH_3$ | " | " |
| 438 | | $CH_2CH_2OCH_3$ | $CH_2CH_2OCH_3$ | " | " |
| 439 | 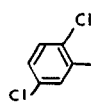 | $CH_2CH_2OCH_3$ | $CH_2CH_2OCH_3$ | " | yellow |
| 440 |  | $CH_2CH_2OCH_3$ | $CH_2CH_2OCH_3$ | " | yellow |
| 441 | | " | " | $C_3H_7(n)$ | " |
| 442 | | $CH_2CH_2CH_2OCH_3$ | $CH_2CH_2CH_2OCH_3$ | $CH_3$ | " |
| 443 | | H | " | " | yellow |
| 444 | | $C_4H_9(n)$ | $C_4H_9(n)$ | " | golden yellow |
| 445 | | $CH_2CH_2CH_2OCH_3$ | $C_6H_5$ | " | orange |
| 446 |  | $C_4H_9(n)$ | $C_4H_9(n)$ | " | red-orange |
| 447 | | $CH_2CH_2CH_2OCH_3$ | $CH_2CH_2CH_2OCH_3$ | " | " |
| 448 | | " |  | " | yellowish red |

EXAMPLE 449

29.5 parts of 2-aminobenzonitrile are dissolved in 800 parts by volume of water and 80 parts by volume of 30% strength hydrochloric acid at room temperature. 750 parts of ice are then added, followed, at from 0° to 5°C, by 77 parts by volume, added all at once, of a 23% strength sodium nitrite solution. After stirring for 2 hours at from 0° to 5°C, the following suspension is added to the clear or turbid diazonium salt solution: 65.5 parts of 2-N,N-diethylamino-3-cyano-4-methyl-6-methoxyethylaminopyridine are dissolved in 80 parts by volume of warm dimethylformamide, 12.5 parts of an addition product of about 23 moles of ethylene oxide to 1 mole of sperm oil alcohol and then added, and the solution is introduced into a mixture of 30 parts by volume of 30% strength hydrochloric acid and 1,000 parts by volume of water, whilst stirring.

About from 500 to 1,000 parts of ice are added to the coupling solution, followed by about 65 parts of 50% strength sodium hydroxide solution to bring the pH of the mixture to from 2.5 to 3.2. After the coupling reaction has terminated, the mixture is warmed to 60°C and the product is filtered off and washed with hot water. After drying, about 97 to 98 parts of a yellow powder of the formula

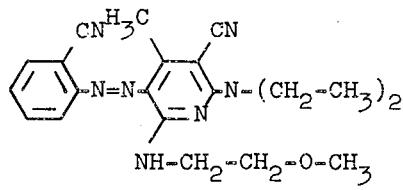

are obtained; the powder gives a yellow solution in dimethyl/formamide.

0.5 part of this dye are mixed thoroughly with 1,000 parts of polystyrene granules or powder by conventional processes. The mixture is then fused, which causes the dye to dissolve. The dye is stable in the melt at up to 300°C. After solidification, a deep yellow polystyrene of excellent fastness to light is obtained. The dye shows equal heat stability when incorporated into fused polyamide. The mass colored polyamide is also very fast to light. The dye is also very suitable for the mass coloring of polypropylene, polyethylene, polyvinyl chloride and polyesters.

EXAMPLE 450

78 parts of 1-amino-2-trifluoromethyl-4-chlorobenzene are dissolved in 400 parts of 96% strength sulfuric acid at from 0° to 20°C. The mixture is cooled to from 0° to 4°C, 130 parts of 45% strength nitrosylsulfuric acid are added and the batch is stirred for 3 hours at from 0° to 5°C. The mixture is then poured onto 1,200 parts of ice, whilst stirring, stirred for a further 30 minutes and filtered. After destroying excess nitrous acid, 123 parts of the coupling component of the formula

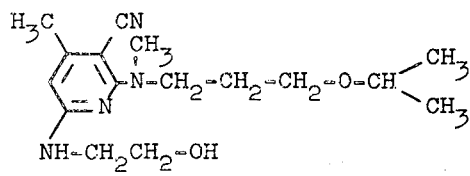

are added to the diazonium salt solution and the pH of the coupling solution is brought to from 2 to 3 by adding sodium hydroxide solution at from 0° to 5°C. After the coupling reaction has terminated, the dye of the formula

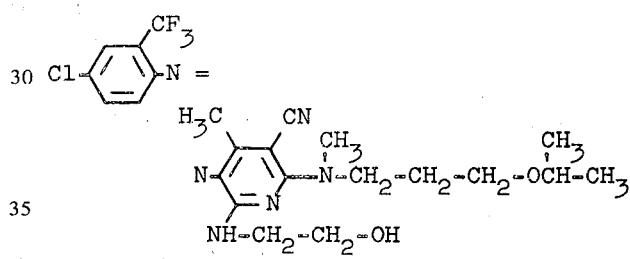

which has precipitated is filtered off, washed with water and dried.

On coloring, 1,000 parts of polystyrene with 0.5 part of this dye analogously to Example 449, a yellow polystyrene of very good fastness to light is obtained.

The dyes characterized, in the table which follows, by their substituents, can also be used for mass coloration in the above manner, giving the hues shown in the table.

Table 12

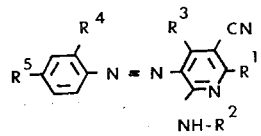

| Example No. | $R^1$ | $R^2$ | $R^3$ | $R^4$ | $R^5$ | Hue of the mass-colored polystyrene |
|---|---|---|---|---|---|---|
| 451 | $N(C_2H_5)_2$ | $(CH_2)_2OCH_3$ | $C_3H_7$ | CN | H | yellow |
| 452 | " | $(CH_2)_3OCH_3$ | $CH_3$ | " | " | " |
| 453 | " | " | " | " | Cl | " |
| 454 | " | $C_2H_5$ | " | " | H | " |
| 455 | " | $CH_3$ | " | " | " | " |
| 456 | " | $(CH_2)_3OCH(CH_3)_2$ | " | " | " | " |
| 457 | $N(CH_3)_2$ | $(CH_2)_2OCH_3$ | " | " | " | " |
| 458 | $N(C_3H_7)_2$ | " | " | " | " | " |
| 459 | " | " | " | $CF_3$ | " | " |
| 460 | " | $(CH_2)_3OCH_3$ | $CH_3$ | $CF_3$ | Cl | " |
| 461 | $N(CH_3)_2$ | $C_2H_5$ | " | CN | H | " |

Table 12-continued

| Example No. | R¹ | R² | R³ | R⁴ | R⁵ | Hue of the mass-colored polystyrene |
|---|---|---|---|---|---|---|
| 462 | N⟨ (azetidinyl) | '' | '' | $CF_3$ | H | '' |
| 463 | N⟨piperidinyl⟩ | '' | '' | '' | Cl | '' |
| 464 | $N(CH_3)_2$ | $CH_2CH_2OH$ | '' | CN | H | '' |
| 465 | '' | $(CH_2)_3OH$ | '' | '' | '' | '' |
| 466 | '' | '' | '' | $CF_3$ | Cl | '' |
| 467 | $N(C_2H_5)_2$ | $CH_2CH_2OCH_3$ | '' | '' | H | '' |
| 468 | N—$C_6H_5$ / $C_2H_5$ | H | '' | '' | '' | '' |
| 469 | '' | $CH_2CH_2OCH_3$ | '' | '' | '' | '' |
| 470 | $N(CH_3)_2$ | $C_2H_5$ | '' | $COOCH_3$ | '' | '' |
| 471 | '' | $CH_2CH_2OCH_3$ | '' | '' | '' | '' |
| 472 | '' | '' | '' | '' | Cl | '' |
| 473 | N⟨$CH_2OH$ / $C_2H_5$⟩ | '' | '' | CN | '' | '' |
| 474 | $N(CH_3)_2$ | $(CH_2)_3OCH(CH_3)_2$ | '' | $CF_3$ | H | '' |
| 475 | $N(C_4H_9)_2$ | $CH_2CH_2OH$ | '' | '' | '' | '' |
| 476 | N⟨$C_6H_5$ / $CH_2CH_2OH$⟩ | $C_2H_5$ | '' | CN | Cl | '' |
| 477 | '' | '' | $C_3H_7$ | '' | '' | '' |
| 478 | '' | '' | '' | $CF_3$ | H | '' |
| 479 | '' | $CH_2CH_2OCH_3$ | $CH_3$ | '' | '' | '' |
| 480 | '' | '' | '' | CN | '' | '' |
| 481 | '' | '' | '' | $COOCH_3$ | Cl | '' |
| 482 | $N(CH_2CH_2OCH_3)_2$ | H | '' | CN | H | '' |
| 483 | '' | '' | '' | $CF_3$ | H | '' |
| 484 | '' | $CH_2CH_2CH_2OCH_3$ | '' | CN | H | '' |
| 485 | '' | '' | H | $SO_2C_6H_5$ | '' | '' |
| 486 | '' | $CH_2CH_2OH$ | $CH_3$ | CN | '' | '' |
| 487 | '' | $CH_2CH_2OCH_3$ | '' | '' | '' | '' |
| 488 | N⟨$CH_2CH_3$ / $C_4H_9(n)$⟩ | '' | $C_3H_7$ | '' | '' | '' |
| 489 | $N[CH(CH_3)_2]_2$ | '' | $CH_3$ | '' | Cl | '' |
| 490 | '' | $CH_2CH_2CH_2OCH_3$ | '' | '' | H | '' |
| 491 | '' | $CH_2CH_2C_6H_5$ | '' | '' | '' | '' |
| 492 | N⟨$C_2H_5$ / $C_4H_9(n)$⟩ | '' | '' | '' | Cl | '' |
| 493 | '' | $CH_2CH_2CH_2OCH_2$ | '' | '' | H | '' |
| 494 | '' | $CH_2CH_2OH$ | '' | '' | '' | '' |
| 495 | N⟨$CH_2CH(CH_3)_2$ / $CH_2CH_2CH_3$⟩ | $CH_2CH_2CH_2OCH_3$ | '' | '' | '' | '' |
| 496 | N⟨$CH—CH_2CH_2$ / $CH_3$⟩ | '' | '' | '' | '' | '' |
| 497 | '' | $CH_2CH_2OH$ | '' | '' | '' | '' |
| 498 | $N(C_2H_5)_2$ | $(CH_2)_3OCH_2C_6H_5$ | '' | '' | '' | '' |
| 499 | '' | $(CH_2)_3OCH_2CH_2OC_6H_5$ | '' | '' | '' | '' |
| 500 | '' | $(CH_2)_3O(CH_2)_4OH$ | '' | '' | '' | '' |
| 501 | '' | $(CH_2)_3O(CH_2)_2OC_4H_9$ | '' | '' | '' | '' |
| 502 | '' | $C_6H_5$ | '' | '' | '' | '' |
| 503 | '' | $C_6H_4OCH_3(m)$ | '' | '' | Cl | orange |
| 504 | '' | $C_6H_4CH_3$ | '' | '' | H | '' |
| 505 | '' | $(CH_2)_6$-N⟨pyrrolidinone⟩ | '' | '' | '' | yellow |
| 506 | '' | $-CH(CH_3)(CH_2)_3C(CH_3)_2-OH$ | '' | '' | '' | '' |
| 507 | '' | -⟨C_6H_{11}⟩ | '' | '' | '' | '' |
| 508 | '' | $(CH_2)_3O$-⟨C_6H_{11}⟩ | '' | '' | '' | '' |

Table 12-continued

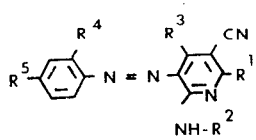

| Example No. | R¹ | R² | R³ | R⁴ | R⁵ | Hue of the mass-colored polystyrene |
|---|---|---|---|---|---|---|
| 509 | " | $CH_2CH_2OCH_3$ | H | $SO_2C_6H_5$ | " | " |
| 510 | " | ⬡ | $CH_3$ | CN | " | " |
| 511 | " | $(CH_2)_3OCHCH_2OCH_3$<br>                    $CH_3$ | " | " | " | " |
| 512 | " | $(CH_2)_3OCH_2CHOC_6H_5$<br>                     $CH_3$ | " | " | " | " |
| 513 | " | $(CH_2)_6OH$ | " | " | " | " |
| 514 | " | $(CH_2)_5$—CN | " | " | " | " |
| 515 | " | $CH_2CH_2OCH_3$ | $C_6H_5$ | " | " | " |
| 516 | " | " | " | $CF_3$ | Cl | " |
| 517 | " | " | H | " | " | " |
| 518 | " | " | $C_2H_5$ | CN | " | " |
| 519 | " | $(CH_2)_5COOCH_3$ | $CH_3$ | " | H | " |
| 520 | " | $(CH_2)_5COOC_2H_5$ | " | " | " | " |
| 521 | " | $(CH_2)_5COOC_3H_7$ | " | " | " | " |
| 522 | " | $(CH_2)_5COOC_4H_9$ | " | " | " | " |
| 523 | " | $CH_2CH_2$—N⬠=O (pyrrolidinone) | " | " | " | " |
| 524 | " | $CH_2CH=CH_2$ | " | " | " | " |
| 525 | $N(CH_3)_2$ | $CH_2CH=CH_2$ | " | " | " | " |
| 526 | $N(C_2H_5)_2$ | $CH_2CH_2CH_2OH$ | " | " | " | " |
| 527 | " | $CH_2CH$—$C_6H_5$<br>         $CH_3$ | " | " | " | " |
| 528 | $N(CHCH_2CH_3)_2$<br>    $CH_3$ | $CH_2CH_2CH_2OCH_3$ | " | " | " | " |
| 529 | $N(C_2H_5)_2$ | $COC_6H_5$ | $CH_3$ | CN | H | " |
| 530 | " | $SO_2C_6H_5$ | " | " | " | " |
| 531 | $N(C_3H_7)_2$ | " | " | " | " | " |

Table 13

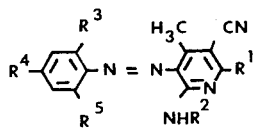

| Example No. | R¹ | R² | R³ | R⁴ | R⁵ | Hue of the mass-colored polystyrene |
|---|---|---|---|---|---|---|
| 532 | $N(C_2H_5)_2$ | $C_2H_5$ | H | $NO_2$ | H | yellow |
| 533 | " | $(CH_2)_3OCH_3$ | " | " | " | " |
| 534 | " | $(CH_2)_3OCH(CH_3)_2$ | " | " | " | " |
| 535 | " | $(CH_2)_3OCH_3$ | $CH_3$ | " | " | orange |
| 536 | " | " | $OCH_3$ | " | " | red-orange |
| 537 | " | $C_2H_5$ | " | " | " | yellowish red |
| 538 | " | " | H | " | " | orange |
| 539 | " | " | CN | " | " | yellowish red |
| 540 | " | $C_3H_7(n)$ | " | " | " | scarlet |
| 541 | " | " | " | " | Cl | bluish red |
| 542 | " | $C_2H_5$ | " | " | " | " |
| 543 | $N(C_3H_7)_2$ | " | " | " | " | " |
| 544 | $N(C_4H_9)_2$ | " | " | " | " | yellowish red |

Table 13-continued

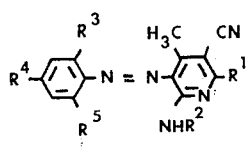

| Example No. | R¹ | R² | R³ | R⁴ | R⁵ | Hue of the mass-colored polystyrene |
|---|---|---|---|---|---|---|
| 545 | N(C₂H₅)₂ | " | Cl | " | H | red |
| 546 | N(C₃H₇)₂ | " | " | " | " | " |
| 547 | " | (CH₂)₃OCH₃ | " | " | " | orange |
| 548 | " | " | NO₂ | " | " | " |
| 549 | N(C₃H₅)₂ | " | " | " | " | red |
| 550 | " | " | CN | " | Br | bluish red |
| 551 | N(CH₂CH₂OCCH₃)₂ O | C₂H₅ | " | H | H | " |
| 552 | " | CH₂CH₂OCOCH₃ | " | " | " | yellow |
| 553 | N(C₂H₅)₂ | CH₂CH₂CH₂OCH₃ | Cl | NO₂ | " | " |
| 554 | " | " | CN | " | " | orange |
| 555 | N(C₄H₉)₂ | " | " | " | " | yellowish red |
| 556 | " | " | Cl | " | " | scarlet |
| 557 | " | " | Br | " | " | orange |
| 558 | " | " | CN | " | " | " |
| 559 | " | " | " | " | Cl | yellowish red |
| 560 | " | " | " | " | Br | bluish red |
| 561 | " | CH₂CH₂OH | " | " | " | " |
| 562 | N(C₂H₅)₂ | (CH₂)₃OC₂H₅ | Cl | " | H | orange |
| 563 | " | " | CN | " | " | yellowish red |
| 564 | N(CH₂CH₂OCH₃)₂ | " | " | " | " | " |
| 565 | N(CH₃)₂ | " | " | " | " | " |
| 566 | N(C₃H₇)₂ | " | Cl | " | " | orange |
| 567 | " | (CH₂)₂OC₂H₅ | " | " | " | " |
| 568 | " | " | CN | " | " | yellowish red |
| 569 | " | " | NO₂ | " | " | red |
| 570 | N(C₂H₅)₂ | " | " | " | " | " |
| 571 | " | " | Br | " | " | red-orange |
| 572 | " | " | COOCH₃ | " | " | " |
| 573 | " | " | H | " | " | orange |
| 574 | " | " | SO₂CH₃ | " | " | red |
| 575 | " | " | CH₃ | " | " | orange |
| 576 | " | " | OCH₃ | " | " | " |
| 577 | " | " | SO₂CH₃ | Cl | " | yellow |
| 578 | " | " | CN | NO₂ | NO₂ | bluish red |
| 579 | " | " | " | " | CN | " |
| 580 | " | " | Cl | " | Cl | yellow-brown |
| 581 | " | CH₂CH₂OCH₃ | H | SO₂CH₃ | " | yellow |
| 582 | " | " | Cl | " | H | " |
| 583 | " | " | Br | NO₂ | Br | yellow-brown |
| 584 | " | CH₂CH₂OH | COOCH₃ | Cl | Cl | yellow |
| 585 | " | " | Cl | SO₂C₆H₅ | H | " |
| 586 | " | " | CN | CN | " | orange |
| 587 | " | " | Cl | Cl | Cl | yellow |
| 588 | N(C₃H₇)₂ | CH₂CH₂CH₂OCH₃ | " | " | " | " |
| 589 | " | " | " | SO₂CH₃ | " | " |
| 590 | " | " | H | N=N—C₆H₅ | H | orange |
| 591 | " | CH₂CH₂OCH₃ | " | " | " | " |
| 592 | N(C₂H₅)₂ | " | Cl | SO₂CH₃ | " | yellow |

Table 14

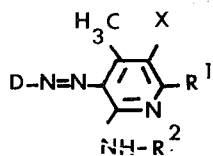

| Example No. | D | R¹ | R² | X | Hue of the mass-colored polystyrene |
|---|---|---|---|---|---|
| 593 | 3-methyl-5-nitrobenzo[c]isothiazol-yl | $N(C_2H_5)_2$ | $CH_2CH_2CH_2OCH_3$ | CN | reddish blue |
| 594 | '' | '' | '' | $CONH_2$ | blue |
| 595 | '' | '' | '' | H | '' |
| 596 | '' | '' | $CH_2CH_2OCH_3$ | CN | violet |
| 597 | 3-methyl-4-cyano-5-methoxycarbonyl-thienyl | pyrrolidino | '' | '' | red |
| 598 | '' | $N(C_3H_7)_2$ | '' | '' | '' |
| 599 | 5-nitro-2-methylthiazol-yl | '' | '' | '' | bluish red |
| 600 | '' | $N(C_2H_5)_2$ | $CH_2CH_2CH_2OCH_3$ | '' | '' |
| 601 | 2-methylthio-1,3,4-thiadiazol-yl | '' | '' | '' | orange |
| 602 | '' | '' | $CH_2CH_2OCH_3$ | '' | '' |
| 603 | '' | $N(C_3H_7)_2$ | '' | '' | yellowish red |
| 604 | '' | '' | $CH_2CH_2OH$ | '' | orange |
| 605 | '' | '' | '' | H | red |
| 606 | '' | '' | $CH_2CH_2C_6H_5$ | CN | orange |
| 607 | 2-(methoxycarbonylethylthio)-5-methyl-1,3,4-thiadiazol-yl | '' | '' | '' | '' |
| 608 | '' | '' | $CH_2CH_2OCH_3$ | '' | '' |
| 609 | '' | '' | $CH_2CH_2C_6H_5$ | '' | '' |
| 610 | 2-methyl-4-nitro-6-cyanophenyl | '' | $CH_2CH_2OCH_3$ | $CONH_2$ | red |
| 611 | '' | '' | '' | H | '' |
| 612 | '' | $N(C_2H_5)_2$ | $CH_2CH_2CH_2OCH_3$ | '' | '' |
| 613 | '' | '' | '' | $CONH_2$ | '' |
| 614 | 2-methyl-4-nitro-6-cyano-3-chlorophenyl | '' | '' | '' | bluish red |
| 615 | '' | '' | '' | H | '' |
| 616 | 2-cyano-4-nitro-6-chlorophenyl | '' | $CH_2CH_2OH$ | $CONH_2$ | '' |
| 617 | '' | $N(CH_3)_2$ | '' | '' | '' |
| 618 | benzothiazol-2-yl | $N(C_2H_5)_2$ | $CH_2CH_2OCH_3$ | CN | yellowish red scarlet |

Table 14-continued

Structure:
$$D-N=N- \text{(pyridine ring with } H_3C, X, R^1, NH-R^2\text{)}$$

| Example No. | D | R¹ | R² | X | Hue of the mass-colored polystyrene |
|---|---|---|---|---|---|
| 619 | " | " | CH₂CH₂CH₂OCH₃ | " | |
| 620 | 6-Cl-benzothiazol-2-yl | " | " | " | " |
| 621 | " | " | CH₂CH₂OCH₃ | " | " |
| 622 | benzisothiazol-3-yl | " | " | " | red |
| 623 | " | " | CH₂CH₂CH₂OCH₃ | " | " |
| 624 | 7-nitrobenzisothiazol-3-yl | " | " | " | bluish red |
| 625 | " | " | CH₂CH₂OCH₃ | " | " |
| 626 | N-phenylphthalimidyl | " | " | " | yellow |
| 627 | 4-nitro-2-methylsulfonyl-phenyl | " | CH₂CH₂CH₂OCH₃ | " | " |
| 628 | " | " | " | " | red |
| 629 | " | " | " | CONH₂ | " |
| 630 | " | " | " | H | " |
| 631 | " | " | C₄H₉(n) | " | " |
| 632 | anthraquinonyl | " | CH₂CH₂CH₂OCH₃ | CN | brown |
| 633 | " | " | (CH₂)₃OC₂H₄OCH₃ | " | yellow-brown |
| 634 | phenylsulfonyl-phenyl | " | H | " | yellow |
| 635 | 4-nitro-2-n-butyl-phenyl | " | " | " | orange |

Table 14-continued

Structure:
$$D-N=N-\underset{\underset{NH-R^2}{N}}{\overset{\overset{H_3C \quad X}{|}}{C}}R^1$$

| Example No. | D | R¹ | R² | X | Hue of the mass-colored polystyrene |
|---|---|---|---|---|---|
| 636 | $O_2N$-C₆H₃(n-C₆H₁₃)- | " | " | " | " |
| 637 | phenyl-N=N-(2,5-dimethoxyphenyl)- | " | " | " | red |
| 638 | phenyl-N=N-(2,6-dimethylphenyl)- | " | $CH_2CH_2OCH_3$ | " | " |
| 639 | Cl-phenyl-N=N-(2-methylphenyl)- | " | " | " | yellowish red |
| 640 | Cl-phenyl-N=N-(2,6-dimethylphenyl)- | " | $CH_2CH_2OH$ | " | scarlet |
| 641 | phenyl-N=N-(2,5-dimethoxyphenyl)- | azetidinyl (N⟨) | $(CH_2)_2O(CH_2)_2OH$ | " | red |
| 642 | phenyl-N=N-phenyl- | " | H | H | orange |
| 643 | (2-CH₃-phenyl)-N=N-(2-CH₃-phenyl)- | " | $CH_2CH_2OCH_3$ | CN | yellowish red |
| 644 | $O_2N$-(3-Cl-phenyl)- | " | $(CH_2)_6OH$ | " | scarlet |
| 645 | " | " | $CH_2CH_2OCCH_3$ ‖ O | " | orange |

Table 14-continued $$\begin{array}{c} H_3C \quad X \\ D-N=N-\!\!\!\!\!\diagup\!\!\!\!\!\diagdown\!\!-R^1 \\ \diagdown\!\!\!N\diagup \\ NH-R^2 \end{array}$$

| Example No. | D | R¹ | R² | X | Hue of the mass-colored polystyrene |
|---|---|---|---|---|---|
| 646 | 2-CN-C₆H₄- | piperidino | CH₂CHOCOCH₂OC₆H₅ | " | yellow |
| 647 | " | morpholino | " | " | " |
| 648 | " | " | (CH₂)₂CH₂OCOCH₃ | " | " |
| 649 | 2-CN-4-NO₂-5-Cl-C₆H₂- | piperidino | (CH₂)₆OH | " | red |
| 650 | 4-NO₂-2-(CH₂CH(C₂H₅)C₄H₉)-C₆H₃- | morpholino | CH₂CH₂OCH₃ | " | orange |
| 651 | 4-NO₂-2-C₄H₉(n)-C₆H₃- | " | " | " | " |
| 652 | 2,3,4-Cl₃-C₆H₂- | piperidino | (CH₂)₃OCH₃ | " | reddish yellow |
| 653 | " | morpholino | " | " | orange |
| 654 | 2,3,5-Cl₃-C₆H₂- | " | " | " | reddish yellow |
| 655 | 2,5-Cl₂-C₆H₃- | " | " | " | " |

Table 15

D—N=N—[pyridine ring with R¹ and NH—R²]

| Example No. | D | R¹ | R² | Hue of the mass-colored polystyrene |
|---|---|---|---|---|
| 656 | 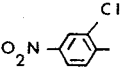 O₂N—C₆H₃(Cl)— | piperidino | H | orange |
| 657 | " | " | CH₂CH₂CH₂OCH₃ | red |
| 658 |  C₆H₅—N=N—C₆H₄— | " | H | orange |
| 659 | " | piperazino-H | CH₂CH₂OCH₃ | red |
| 660 | 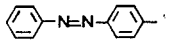 Cl—C₆H₄—N=N—(2,5-dimethylphenyl)— | N(C₂H₅)₂ | H | " |
| 661 | " | " | CH₂CH₂OCH₃ | " |
| 662 |  NC—(2,4,6-trimethyl-3,5-dicyanophenyl)— | " | " | " |

Table 16

D—N=N—[pyridine ring with CH₃, CN, R², and NHR¹]

| Example No. | D | R¹ | R² | Hue |
|---|---|---|---|---|
| 663 | 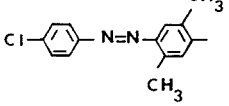 thiophene with C₂H₅, CN, C₂H₅OC(O), CH₃ | CH₂CH₂OCH₃ | N(C₂H₅)₂ | ruby |
| 664 | " | CH₂CH₂CH₂OCH₃ | " | " |
| 665 | " | C₄H₉(n) | " | " |
| 666 | " | H | " | red |
| 667 | " | CH₂CH₂CH₂OCH₃ | piperidino | ruby |
| 668 | 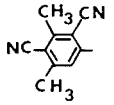 thiophene with C₃H₇(n), CN, C₂H₅OC(O), CH₃ | " | N(C₂H₅)₂ | " |

Table 16-continued

![structure showing D-N=N-pyridine with CH3, CN, R2, NHR1 substituents]

| Example No. | D | R¹ | R² | Hue |
|---|---|---|---|---|
| 669 | " | " | $N(CH_2CH_2CH_2OCH_3)_2$ | " |
| 670 | " | $CH_2CH_2OCH_3$ | $N(CH_2CH_2OCH_3)_2$ | " |
| 671 | " | $C_4H_9(n)$ | $N(C_4H_9(n))_2$ | " |
| 672 | 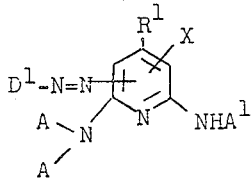 | " | $N(C_2H_5)_2$ | red |
| 673 | " | $CH_2CH_2CH_2OCH_3$ | " | " |
| 674 | " | $CH_2CH_2OCH_3$ | " | " |
| 675 | " | $CH_2CH_2CH_2OCH_3$ | $N(CH_2CH_2OCH_3)_2$ | " |
| 676 | 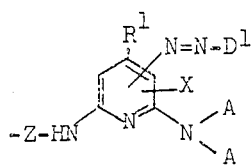 | $CH_2CH_2CH_2OCH_3$ | $N(C_2H_5)_2$ | red |
| 677 | " | $C_4H_9(n)$ | " | " |
| 678 | NC—⟨Cl⟩— | $C_4H_9(n)$ |  | red-orange |

We claim:

1. A thermoplastic resinous material which has been colored by mixing with a dye and distributing the dye homogeneously in the melt, said dye having the formula $$D^1-N=N-\underset{\underset{A}{\overset{A}{N}}}{\overset{R^1}{\underset{}{\bigcirc}}}\overset{X}{\underset{NHA^1}{}}$$

wherein
A¹ is A or $$-Z-HN-\underset{\underset{A}{\overset{A}{N}}}{\overset{R^1}{\underset{}{\bigcirc}}}\overset{N=N-D^1}{\underset{X}{}}$$

D¹ is thienyl substituted by cyano, $C_1$- to $C_3$-alkyl, $C_{17}H_{35}$, phenyl or $C_1$- to $C_8$-alkoxycarbonyl;
R¹ is hydrogen or alkyl of 1 to 3 carbon atoms;
X is hydrogen, carbamoyl or cyano;
A is hydrogen; $C_1$ to $C_8$-alkyl; $C_2$- to $C_8$-alkyl substituted by hydroxy, OCHO, $OCOCH_3$, $OCOC_2H_5$, $OCOC_3H_7$, $C_2$- to $C_4$-hydroxyalkoxy, cyano, $C_1$- to $C_8$-alkoxy, $C_1$- to $C_8$-alkoxycarbonyl, phenoxy or phenyl; cyclohexyl; methylcyclohexyl; norbornyl; phenyl; β-hydroxy-β-phenylethyl; or $(CH_2)_3(OC_2H_4)_mOT$;
m is 1 or 2;
T is $C_1$- to $C_4$-alkyl, benzyl or phenyl;

$$N\underset{A}{\overset{A}{\diagup}}$$

is pyrrolidino, piperidino, morpholino, hexamethyleneimino piperazino, N-methylpiperazino or N-β-hydroxyethylpiperazino and Z is $C_2$- to $C_8$-alkylene, $-CH_2-\underset{OH}{CH}-CH_2-$, $-(CH_2)_3-N-(CH_2)_3-$, $-(CH_2)_3-OC_2H_4-O-(CH_2)_3-$, $-(CH_2)_3-O-(CH_2)_4O(CH_2)_3-$,

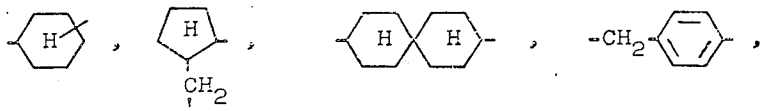

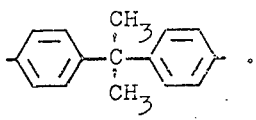

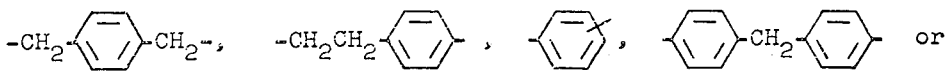

2. A thermoplastic resinous material according to claim 1 containing as the dye a compound of the formula in claim 1, wherein X is cyano and $R^1$ is methyl.

3. A thermoplastic resinous material according to claim 1 containing as the dye a compound of the formula in claim 1, wherein
   A is hydrogen, $C_1$- to $C_8$-alkyl, $C_1$- to $C_8$-alkoxy, substituted $C_2$- or $C_3$-alkyl, phenoxyethyl, phenoxypropyl, cyclohexyl, methylcyclohexyl, norbornyl, phenyl-$C_1$- to $C_4$-alkyl or phenyl and
   $A^1$ is A.

4. A thermoplastic resinous material according to claim 1 containing as the dye a compound of the formula in claim 1, wherein Z is $C_2$- to $C_6$-alkylene,

—(CH₂)₃OC₂H₄O(CH₂)₃—,

—(CH₂)₃(OC₂H₄)₂O(CH₂)₃—, —(CH₂)₃O(CH₂)₄O(CH₂)₃—,

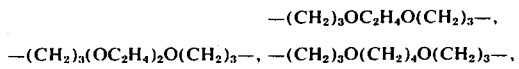

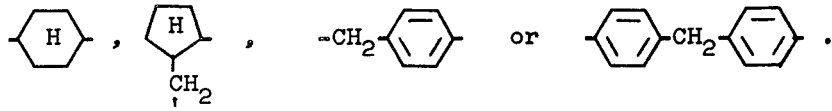

5. Thermoplastic resinous material according to claim 1 containing the dye of the formula

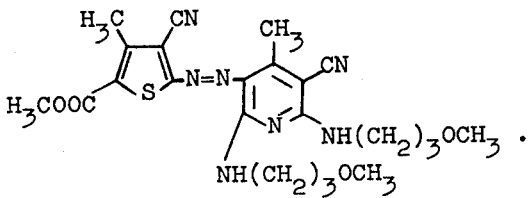

6. A thermoplastic resinous material according to claim 1 colored with 0.01 to 1% of the dye according to the formula in claim 1.

7. A thermoplastic resinous material according to claim 1 wherein said material is polystyrene, a polyamide, polyethylene, polypropylene, a polyester, a polycarbonate or polyvinyl chloride.

* * * * *